(12) United States Patent
Ookawa

(10) Patent No.: US 8,427,362 B2
(45) Date of Patent: Apr. 23, 2013

(54) RADAR APPARATUS FOR RADIATING AND RECEIVING ELECTRIC WAVES HAVING GRATING LOBES

(75) Inventor: Kunihiko Ookawa, Nisshin (JP)

(73) Assignee: Denso Corporation, Kariya (JP)

(*) Notice: Subject to any disclaimer, the term of this patent is extended or adjusted under 35 U.S.C. 154(b) by 364 days.

(21) Appl. No.: 12/807,594

(22) Filed: Sep. 8, 2010

(65) Prior Publication Data

US 2011/0063170 A1    Mar. 17, 2011

(30) Foreign Application Priority Data

Sep. 14, 2009  (JP) ................. 2009-212266

(51) Int. Cl.
*H01Q 3/00* (2006.01)
*G01S 13/91* (2006.01)

(52) U.S. Cl.
USPC .............................. 342/81; 342/70

(58) Field of Classification Search .......... 342/81, 342/83
See application file for complete search history.

(56) References Cited

U.S. PATENT DOCUMENTS

| | | | | |
|---|---|---|---|---|
| 3,268,890 A | * | 8/1966 | Birge | 342/158 |
| 3,270,336 A | * | 8/1966 | Birge | 342/158 |
| 3,825,928 A | | 7/1974 | Williams | |
| 3,842,417 A | * | 10/1974 | Williams | 342/158 |
| 4,542,653 A | * | 9/1985 | Liu | 73/626 |

FOREIGN PATENT DOCUMENTS

| | | |
|---|---|---|
| GB | 48-090493 | 11/1973 |
| JP | 2 023 940 | 1/1980 |
| JP | 55-003297 | 1/1980 |
| JP | 07-191129 | 7/1995 |
| JP | 09-284035 | 10/1997 |
| JP | 11-231040 | 8/1999 |
| JP | 2001-174539 | 6/2001 |
| JP | 2003-110335 | 4/2003 |
| JP | 2005-195490 | 7/2005 |

* cited by examiner

*Primary Examiner* — Jack Keith
*Assistant Examiner* — Matthew M Barker
(74) *Attorney, Agent, or Firm* — Harness, Dickey & Pierce, PLC

(57) ABSTRACT

A radar apparatus has a transmission array antenna for radiating electromagnetic waves containing a main lobe and a grating lobe in a transmission directivity, a reception array antenna for receiving electromagnetic waves radiated from the transmission array antenna and reflected from a target, and a microcomputer for setting the reception antenna in reception directivities one after another by placing a null point in a grating lobe receiving area of each directivity and placing the null points of the directivities at different positions. The microcomputer produces a reception signal, produced from the received electromagnetic waves containing the main lobe reflected from the target, every change of the reception directivity and detects the target from the average of the reception signals.

18 Claims, 10 Drawing Sheets

RADAR APPARATUS FOR RADIATING AND RECEIVING ELECTRIC WAVES HAVING GRATING LOBES

CROSS-REFERENCE TO RELATED APPLICATION

This application is based upon and claims the benefit of priority of the prior Japanese Patent Application 2009-212266 filed on Sep. 14, 2009, so that the contents of which are incorporated herein by reference.

BACKGROUND OF THE INVENTION

1. Field of the Invention

The present invention relates to a radar apparatus which radiates electromagnetic waves having a main lobe and grating lobes from an array antenna, receives the electromagnetic waves containing the main lobe reflected from a target in another array antenna, and produces a detection signal from the received electromagnetic waves, while suppressing influence of the grating lobes of the radiated electromagnetic waves on the detection signal, to detect the target located in a detection area.

2. Description of Related Art

An array antenna generally radiates electromagnetic waves having a main lobe and grating lobes, and another array antenna receives these electromagnetic waves. An antenna system having these antennas detects a target, reflecting the main lobe of the radiated electromagnetic waves in a detection area, from the received electromagnetic waves. In this case, to precisely detect the distance between the system and the target and the bearing angle from the system to the target, it is required to suppress the influence of the grating lobes on the received electromagnetic waves.

Japanese Patent Specification No. 4147447 discloses an array antenna system for suppressing influence of grating lobes. In this technique, this system contains a transmission array antenna constituted of a plurality of antenna elements on the grating suppressed side, a transmission processing section connected with this transmission array antenna, a reception array antenna constituted of a plurality of antenna elements on the grating suppressing side, and a reception processing section connected with this reception array antenna. The transmission array antenna radiates electromagnetic waves having a main lobe and grating lobes in a radiation directivity, and the reception array antenna receives electromagnetic waves in a reception directivity. The radiation directivity on the grating suppresses side is expressed by a power pattern of the radiated electromagnetic waves with respect to the direction of the radiated electromagnetic waves. The reception directivity on the grating suppressing side is expressed by a pattern of sensitivity to the electromagnetic waves incident on the reception array antenna with respect to the direction of the electromagnetic waves.

The reception directivity is set to have a single null point in a null point direction corresponding to the radiation direction of each grating lobe. Therefore, the sensitivity of the reception array antenna to electromagnetic waves coming from directions of a null point area including the null point direction of each null point is extremely lowered. Further, as compared with the power of the radiated main lobe, the power of each radiated grating lobe is sufficiently high in a directional area of the grating lobe.

With this structure of the system, the processing sections control the array antennas such that the direction of each grating lobe radiated from the transmission array antenna always coincides with the direction of one null point of the reception directivity. When the transmission array antenna radiates electromagnetic waves having a main lobe and grating lobes such that the main lobe is radiated in a detection area, a target placed in the detection area reflects the main lobe of the electromagnetic waves, the reception array antenna receives the electromagnetic waves containing the main lobe, and the reception processing section detects the target from the received electromagnetic waves. Because the direction of each grating lobe on the grating suppressed side coincides with the direction of one null point set in the reception directivity on the grating suppressing side, when the grating lobe width of the grating lobe area on the grating suppressed side is equal to or narrower than the null width of the null point area on the grating suppressing side, the grating lobe reflected from an object is not contained in the received electromagnetic waves. Therefore, when the grating lobe width of the grating lobe area is equal to or narrower than the null width of the null point area, the power of each whole grating lobe can be suppressed in the received electromagnetic waves.

Therefore, when the grating lobe width of the grating lobe area is equal to or narrower than the null width of the null point area, the antenna system can substantially lower the sensitivity of the reception array antenna in the radiation directions of the grating lobes, and the antenna system can detect the target placed in the detection area.

However, when the grating lobe width of the grating lobe on the grating suppressed side is wider than the null width of the null point area on the grating suppressing side, the power of only a portion of each grating lobe is suppressed in the received electromagnetic waves, but the power of the whole grating lobe cannot be suppressed in the received electromagnetic waves. Therefore, it is difficult or impossible to sufficiently lower the sensitivity in the radiation directions of the grating lobes, and the antenna system cannot detect the target placed in the detection area with high precision.

Further, a snap-shot technique is well known. In this technique, each time the reception array antenna receives the electromagnetic waves in a scanning period of time, a reception signal is produced from the received electromagnetic waves. Then, the reception signals produced in a predetermined period of time are summed up to obtain a summed reception signal. In this summed reception signal, the signal level corresponding to the main lobe is increased as compared with the signal level of one reception signal. However, the signal level corresponding to each grating lobe is also increased in the summed reception signal. As a result, even when the snap-shot technique is used to detect the target, the precision in the detection of the target is not improved.

SUMMARY OF THE INVENTION

An object of the present invention is to provide, with due consideration to the drawbacks of the conventional array antenna system, a radar apparatus which radiates electromagnetic waves containing a main lobe and a grating lobe and receives electromagnetic waves containing the main lobe reflected from a target to detect the target from the received electromagnetic waves with high precision while suppressing influence of the grating lobe on the detection of the target.

According to the first aspect of this invention, the object is achieved by the provision of a radar apparatus comprising a transmission array antenna, a reception array antenna, a control unit that controls the transmission array antenna to radiate electromagnetic waves, containing a main lobe and a grating lobe, in a transmission directivity and controls the reception array antenna to receive electromagnetic waves, radiated from the transmission array antenna and reflected from a target, in a reception directivity, and a detecting unit that detects information about the target from the electromagnetic waves received in the reception array antenna.

The control unit sets one of the array antennas as a grating lobe suppressing antenna, and sets the grating lobe suppressing antenna in a plurality of directivities one after another. Each of the directivities of the grating lobe suppressing antenna has a null point in a null point setting area. This null point setting area corresponds to an area of the grating lobe in the directivity of the other array antenna. Positions of the null points placed in the respective directivities of the grating lobe suppressing antenna are differentiated from one another in the null point setting area.

The detecting unit produces a reception signal from the received electromagnetic waves each time the control unit sets one directivity of the grating lobe suppressing antenna, determines an average of the produced reception signals corresponding to the directivities of the grating lobe suppressing antenna, and detects information about the target from the average of the reception signals.

The transmission directivity of the transmission array antenna is expressed by a power pattern of electromagnetic waves radiated from the antenna with respect to the radiation direction (or angle) of the electromagnetic waves. The reception directivity of the reception array antenna is expressed by a pattern of sensitivity to incident electromagnetic waves with respect to the incident direction (or angle) of the electromagnetic waves.

With this structure of the radar apparatus, when the reception array antenna is set as the grating lobe suppressing antenna, the electromagnetic waves radiated from the transmission array antenna in the transmission directivity (see FIG. 3) are reflected, and the reflected electromagnetic waves are received in the reception array antenna each time the reception array antenna is set in one of the reception directivities (see FIG. 5). In contrast, when the transmission array antenna is set as the grating lobe suppressing antenna, each time the electromagnetic waves are radiated from the transmission array antenna in one of the transmission directivities, the electromagnetic waves are reflected, and the reflected electromagnetic waves are received in the reception array antenna set in the reception directivity. A reception signal is produced from the received electromagnetic waves corresponding to each directivity of the grating lobe suppressing antenna, Each directivity of the grating lobe suppressing antenna and the directivity of the other antenna can be combined into a transmission-reception composite directivity (see FIG. 6). Therefore, electromagnetic waves incident on the reception array antenna are substantially received by the reception array antenna in each transmission-reception composite directivity. This transmission-reception composite directivity has a null area in its null point setting area corresponding to the area of the grating lobe. Therefore, when the grating lobe radiated from the transmission array antenna is reflected and is incident on the reception array antenna, the reception array antenna receives the reflected grating lobe while considerably suppressing a portion of the grating lobe corresponding to the null area of one transmission-reception composite directivity.

A signal denoting the average of the reception signals is produced from electromagnetic waves received in an average transmission-reception composite directivity (see FIG. 7) which denotes the average of the transmission-reception composite directivities corresponding to the respective directivities of the grating lobe suppressing antenna.

Because each directivity of the grating lobe suppressing antenna has one null point in the null point setting area corresponding to the area of the grating lobe in the directivity of the other array antenna, the power of the received electromagnetic waves is extremely reduced in a null area surrounding the null point. Therefore, the transmission-reception composite directivity determined from each directivity of the grating lobe suppressing antenna and the directivity of the other antenna also has a null area corresponding to the null area of the directivity of the grating lobe suppressing antenna.

Even when the width (i.e., the null point width) of the null area corresponding to each null point is narrower than the width (i.e., the grating lobe width) of the area of the grating lobe, the received electromagnetic waves substantially lacks a portion of the grating lobe which corresponds to the null area surrounding the null point. Therefore, even when an object exists in the radiation direction of the grating lobe while a target exists in the radiation direction of the main lobe, each reception signal can contain information about the target while substantially suppressing influence of a portion of the grating lobe. Further, when only a target exists, the main lobe reflected from the target can be received in the reception array antenna, but a portion of the grating lobe is not received in the reception array antenna even when the target is placed in the radiation direction of the portion of the grating lobe. Therefore, each reception signal can contain information about the target while substantially suppressing influence of a portion of the grating lobe.

Further, because positions of the null points placed in the respective directivities of the grating lobe suppressing antenna are differentiated from one another in the null point setting area, the null areas corresponding to the null points cover the whole null point setting area corresponding to the area of the grating lobe. This means that the average transmission-reception composite directivity has a sufficiently-reduced power or sensitivity in its null point setting area corresponding to the area of the grating lobe. Therefore, the average of the reception signals can be substantially produced from the received electromagnetic waves reflected from the target without substantially receiving any influence of the grating lobe.

Accordingly, even when the null point width is narrower than the grating lobe width, influence of the grating lobe on the average of the reception signals can be sufficiently suppressed. That is, the radar apparatus can detect information about the target with high precision.

In the well-known snap-shot technique, although a plurality of reception signals are produced to detect the target from the reception signals. However, the precision in the detection of the target from the reception signals is substantially the same as the precision in the detection of the target from one reception signal. In contrast, in the present invention, positions of the null points placed in the respective directivities are differentiated from one another in the null point setting area corresponding to the area of the grating lobe. Accordingly, the influence of the grating lobe on the average of the reception signals can be suppressed.

Preferably, the control unit controls the transmission array antenna to change a radiation direction of the main lobe of the electromagnetic waves in a detection area each time the control unit sets the grating lobe suppressing antenna in one directivity and controls the reception array antenna to receive the main lobe in a maximum sensitivity. The detecting unit produces one reception signal each time the radiation direction of the main lobe is changed by a predetermined angle, selects the reception signal having a maximum level from the reception signals each time the control unit sets the grating lobe suppressing antenna in one directivity, determines an average of the selected reception signals corresponding to the directivities of the grating lobe suppressing antenna, and detects information about the target from the average of the reception signals.

With this structure, when the main lobe of the radiated electromagnetic waves is reflected from a target, the reflected main lobe is received in the reception array antenna in the maximum sensitivity. Therefore, when the grating lobe suppressing antenna is set in one directivity, each reception signal formed by the reflected main lobe has a maximum level among the reception signals. In this case, even when the grating lobe of the radiated electromagnetic waves is reflected from an object and is contained in the reception signal having the maximum level, influence of a portion of the grating lobe is suppressed in this reception signal.

Therefore, the average of the selected reception signals indicates information about the target while suppressing the influence of the grating lobe reflected from the object. Accordingly, even when the target reflects the main lobe while the object reflects the grating lobe, the radar apparatus can detect information about the target with high precision while suppressing influence of the grating lobe.

Preferably, the control unit controls the transmission array antenna to change a radiation direction of the main lobe of the electromagnetic waves in a detection area each time the control unit sets the grating lobe suppressing antenna in one directivity, and the detecting unit produces one reception signal each time the radiation direction of the main lobe is changed by a predetermined angle, produces a composite reception signal having a level pattern by serially connecting levels of the reception signals, which corresponds to one directivity of the grating lobe suppressing antenna and is arranged in an order of the radiation direction of the main lobe, for each directivity of the grating lobe suppressing antenna, calculates an average of the composite reception signals, and detects information about the target from the average.

With this structure, when only a target exists, the composite reception signals corresponding to one directivity of the grating lobe suppressing antenna has the same level pattern as the power pattern of the transmission-reception composite directivity corresponding to the directivity of the grating lobe suppressing antenna.

Each composite reception signal has the level of the reception signal produced from the mail lobe reflecting the target and the level of the reception signal produced from the grating lobe reflecting the target. However, influence of a portion of the grating lobe corresponding to one null point of the directivity of the grating lobe suppressing antenna is considerably suppressed in the composite reception signal. Further, the portions of the null points of the directivities are differentiated from one another.

Therefore, the influence of the grating lobe is sufficiently suppressed in the average of the composite reception signals. Accordingly, when only a target exists, the radar apparatus can detect information about the target with high precision while suppressing influence of the grating lobe reflected from the target.

According to the second aspect of this invention, the object is achieved by the provision of a radar apparatus comprising a radar apparatus, comprising the transmission array antenna, the reception array antenna, the control unit and the detecting unit. The control unit further sets one of the array antennas as a grating lobe suppressing antenna, and sets the grating lobe suppressing antenna in a plurality of directivities one after another such that each of the directivities of the grating lobe suppressing antenna has a null point in a null point setting area, which corresponds to an area of the grating lobe in the directivity of the other array antenna, and such that positions of the null points placed in the respective directivities of the grating lobe suppressing antenna are differentiated from one another in the null point setting area. The control unit further controls the transmission array antenna to set a radiation direction of the main lobe to a plurality of scanning directions, covering a detection area, one after another. The detecting unit produces a reception signal from the received electromagnetic waves, each time the control unit sets the radiation direction of the main lobe to one scanning direction while setting the grating lobe suppressing antenna in one directivity, to obtain the reception signals corresponding to the scanning directions and the directivities of the grating lobe suppressing antenna. The detecting unit selects one reception signal having a minimum level from the reception signals, corresponding to the directivities of the grating lobe suppressing antenna and one scanning direction, for each of the scanning directions, and detects information about the target from the selected reception signals.

The transmission directivity of the transmission array antenna is expressed by a power pattern of electromagnetic waves radiated from the antenna with respect to the radiation direction (or angle) of the electromagnetic waves. The reception directivity of the reception array antenna is expressed by a pattern of sensitivity to incident electromagnetic waves with respect to the incident direction (or angle) of the electromagnetic waves.

With this structure of the radar apparatus, the transmission-reception composite directivity determined from each directivity of the grating lobe suppressing antenna and the directivity of the other antenna has a null area in its null point setting area corresponding to the area of the grating lobe. Therefore, when the grating lobe radiated from the transmission array antenna is reflected and is incident on the reception array antenna, the reception array antenna receives the reflected grating lobe while considerably suppressing a portion of the grating lobe corresponding to the null area of one transmission-reception composite directivity.

The null areas in the transmission-reception composite directivities corresponding to the directivities of the grating lobe suppressing antenna differ from one another. Therefore, a portion of the grating lobe considerably suppressed is changed with the position of the null area of the transmission-reception composite directivity.

When the radiation direction of the main lobe is changed to the scanning directions one after another to search the detection area for a target, each reception signal is formed from the electromagnetic waves reflected from the target and received in the reception array antenna. The combination of the reception signals corresponding to the scanning directions and each directivity of the grating lobe suppressing antenna has a level pattern which is the same as the power pattern of the transmission-reception composite directivity corresponding to the directivity of the grating lobe suppressing antenna.

Each time the radiation direction of the main lobe is changed to one of specific scanning directions so as to place a target in the radiation direction of a portion of the grating lobe, the reception signal corresponding to each specific scanning direction is formed of a portion of the grating lobe reflected from the target. Further, each directivity of the grating lobe suppressing antenna has a null area corresponding to one portion of the grating lobe. Therefore, when one reception signal having a minimum level is selected from the reception signals corresponding to one specific scanning direction and the directivities of the grating lobe suppressing antenna, the influence of the portion of the grating lobe corresponding to the specific scanning direction is considerably suppressed in the selected reception signal.

Further, because positions of the null points placed in the respective directivities of the grating lobe suppressing antenna are differentiated from one another in the null point setting area, the null areas corresponding to the null points cover the whole null point setting area corresponding to the area of the grating lobe. Therefore, when one reception signal having a minimum level is selected from the reception signals, corresponding to one scanning direction and the directivities of the grating lobe suppressing antenna, for each scanning direction, the influence of the grating lobe reflected from the target is sufficiently suppressed in the combination of the selected reception signals.

Accordingly, even when the null point width is narrower than the grating lobe width, the radar apparatus can detect information about the target with high precision while sufficiently suppressing the influence of the grating lobe reflected from the target.

According to the third aspect of this invention, the object is achieved by the provision of a radar apparatus comprising a radar apparatus, comprising the transmission array antenna, the reception array antenna, the control unit and the detecting unit. The control unit further sets one of the array antennas as a grating lobe suppressing antenna, and sets the grating lobe suppressing antenna in a plurality of directivities one after another such that each of the directivities of the grating lobe suppressing antenna has a null point in a null point setting area, which corresponds to an area of the grating lobe in the directivity of the other array antenna, and such that positions of the null points placed in the respective directivities of the grating lobe suppressing antenna are differentiated from one another in the null point setting area. The control unit further controls the transmission array antenna to set a radiation direction of the main lobe to a plurality of scanning directions, covering a detection area, one after another. The detecting unit produces a reception signal from the received electromagnetic waves, each time the control unit sets the radiation direction of the main lobe to one scanning direction while setting the grating lobe suppressing antenna in one directivity, to obtain the reception signals corresponding to the scanning directions and the directivities of the grating lobe suppressing antenna. The detecting unit detects a pattern of levels of the reception signals, corresponding to one scanning direction and the directivities of the grating lobe suppressing antenna, for each scanning direction, and detects information about the target from the level patterns.

The transmission directivity of the transmission array antenna is expressed by a power pattern of electromagnetic waves radiated from the antenna with respect to the radiation direction (or angle) of the electromagnetic waves. The reception directivity of the reception array antenna is expressed by a pattern of sensitivity to incident electromagnetic waves with respect to the incident direction (or angle) of the electromagnetic waves.

With this structure of the radar apparatus, the transmission-reception composite directivity determined from each directivity of the grating lobe suppressing antenna and the directivity of the other antenna has a null area in its null point setting area corresponding to the area of the grating lobe. Therefore, when the grating lobe radiated from the transmission array antenna is reflected and is incident on the reception array antenna, the reception array antenna receives the reflected grating lobe while considerably suppressing a portion of the grating lobe corresponding to the null area of one transmission-reception composite directivity.

The null areas in the transmission-reception composite directivities corresponding to the directivities of the grating lobe suppressing antenna differ from one another. Therefore, different portions of the grating lobe are considerably suppressed depending on the transmission-reception composite directivities.

When the radiation direction of the main lobe is changed to the scanning directions one after another to search the detection area for a target, each reception signal is formed by the electromagnetic waves reflected from the target and received in the reception array antenna. The combination of the reception signals corresponding to each directivity of the grating lobe suppressing antenna and the scanning directions has a level pattern which is the same as the power pattern of the transmission-reception composite directivity (see FIG. 6) corresponding to the directivity of the grating lobe suppressing antenna.

When the radiation direction of the main globe is changed to a first scanning direction so as to place a target in the radiation direction of the main globe, the reception signals corresponding to the first scanning direction and the directivities of the grating lobe suppressing antenna are formed by the same portion of the main lobe reflected from the target. Because the transmission-reception composite directivities have the same power in the area of the main lobe, the reception signals, each of which is formed by the same portion of the main lobe, have the same level. Therefore, when levels of the reception signals corresponding to the first scanning direction form a flat pattern, the radar apparatus can judge that the target exists in the first scanning direction.

In contrast, when the radiation direction of the main globe is changed to a second scanning direction so as to place a target in the radiation direction of a portion of the grating globe, the reception signals corresponding to the second scanning direction and the directivities of the grating lobe suppressing antenna are formed by the same portion of the grating lobe reflected from the target. The power or sensitivity values in the directivities of the grating lobe suppressing antenna are considerably differentiated from one another in the area of this portion of the grating lobe. In this case, levels of the reception signals, corresponding to the second scanning direction and the directivities of the grating lobe suppressing antenna, form a considerably-curved pattern. Therefore, when levels of the reception signals corresponding to the second scanning direction form a considerably-curved pattern, the radar apparatus can judge that each of the reception signals corresponding to the second scanning direction is formed of a portion of the grating lobe.

Accordingly, the precision in the detection of information about the target placed in the detection area can be heightened.

DETAILED DESCRIPTION OF THE PREFERRED EMBODIMENTS

Figure 1:
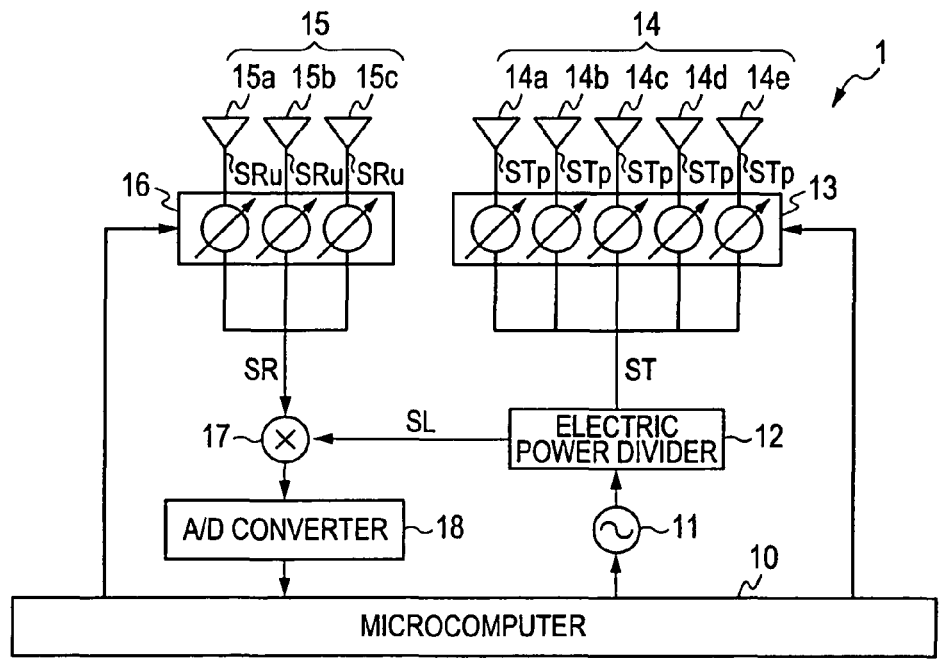
FIG. 1 is a block diagram of a radar apparatus according to the first embodiment of the present invention.

Embodiments of the present invention will now be described with reference to the accompanying drawings, in which like reference numerals indicate like parts, members or elements throughout the specification unless otherwise indicated.

First Embodiment

FIG. 1 is a block diagram of a radar apparatus according to the first embodiment. A radar apparatus 1 is, for example, formed of a frequency modulated continuous wave (FM CW) type electronically agile radar, and the radar apparatus 1 is, for example, mounted on a vehicle.

As shown in FIG. 1, the radar apparatus 1 has a microcomputer 10, an oscillator 11 for oscillating at a changeable frequency in the millimeter wave band under control of the microcomputer 10 to generate a high frequency signal of which the frequency is changed with time in a triangular shape so as to be increased and decreased at predetermined intervals, an electric power divider 12 for dividing electric power of the high frequency signal into first and second portions to produce a transmission signal ST and a local signal SL, a transmission phase shifter 13 having a plurality of (e.g., five) shifting portions for shifting the phase of the transmission signal ST in each of the shifting portions, under control of the microcomputer 10, to produce a plurality of processed transmission signals STp (e.g., five signals STp), of which the phases are shifted from one another, and a transmission array antenna 14 having a plurality of transmission antenna elements (e.g., five elements) 14a, 14b, 14c, 14d and 14e for forming electromagnetic waves, respectively, modulated with the processed transmission signals STp in the antenna elements 14a to 14e and radiating the electromagnetic waves as a transmission beam of electromagnetic waves in a transmission directivity (or with a transmission directivity pattern). As described later in detail, this transmission beam contains a main lobe and a pair of grating lobes.

The antenna elements 14a to 14e of the array antenna 14 are, for example, located at equal intervals on a transmission antenna surface. The radiation direction of the main lobe of the transmission beam is defined on the basis of the antenna surface. The radiation direction perpendicular to the antenna surface is defined as zero degree, and the radiation direction parallel to the antenna surface is defined as ±90 degrees. The radiation direction of the main lobe of the transmission beam depends on the phase differences of the processed transmission signals STp. Because the microcomputer 10 controls the phase shifter 13 to adjust the phase of the processed transmission signal STp for each of the antenna elements 14a to 14e, the main lobe of the transmission beam can be changeably radiated in a desired radiation direction under control of the microcomputer 10.

The transmission directivity of the array antenna 14 is expressed by a power pattern of the electromagnetic waves radiated from the antenna 14 with respect to the radiation direction (or angle) of the electromagnetic waves. This power pattern has an area of the main lobe centering the radiation direction of the main lobe and an area of each grating lobe centering the radiation direction of the grating lobe. The angle between the main lobe radiation direction and each grating lobe radiation direction depends on the arrangement of the antenna elements 14a to 14e, and the microcomputer 10 stores this angle. In this embodiment, the radar apparatus 1 scans a detection area while changing the radiation direction of the main lobe and fixing the power pattern of the transmission directivity.

The radar apparatus 1 further has a reception array antenna 15 having a plurality of reception antenna elements (e.g., three elements) 15a, 15b and 15c for receiving a reflected beam of electromagnetic waves in each of the antenna elements 15a to 15c in a reception directivity (or with a reception directivity pattern) and producing a plurality of unprocessed reception signals SRu from the received beam in the antenna elements 15a to 15c, a reception phase shifter 16 for shifting the phase of each unprocessed reception signal SRu by a phase adjusting value set by the microcomputer 10 to produce a plurality of processed reception signals and to produce a reception signal SR by combining the processed reception signals with one another, a mixer 17 for mixing the reception signal SR with the local signal SL of the divider 12 to perform the synchronous detection for the reception signal SR and taking out a base band signal from the mixed signal, and an analog-to-digital (A/D) converter 18 for converting the base band signal into digital data.

The antenna elements 15a to 15c of the reception array antenna 15 are located at equal intervals on a reception antenna surface. This reception antenna surface and the transmission antenna surface of the transmission array antenna 14 are set to be parallel to each other. The direction of the reflected beam incident on the array antenna 15 is defined on the basis of the reception antenna surface. The incident direction perpendicular to the reception antenna surface is defined as 0 degree, and the incident direction parallel to the reception antenna surface is defined as ±90 degrees. The incident direction of the reflected beam received in the array antenna 15 is determined from the phase differences of the unprocessed reception signals SRu outputted from the antenna elements 15a to 15c. Therefore, the microcomputer 10 can detect the incident direction of the received beam.

The microcomputer 10 has a central processing unit (CPU) including a digital signal processor (DSP), a read only memory (ROM) for storing control programs, a random access memory (RAM) for storing the digital data, a backup RAM and an input-output (I/O) interface (not shown). The DSP performs fast Fourier transform (FFT) for the digital data, while executing the control programs, to obtain information about a target.

The reception directivity of the array antenna 15 is expressed by a pattern of the sensitivity to the incident electromagnetic waves with respect to the incident direction (or angle) of the electromagnetic waves. This reception directivity has the maximum sensitivity in a main lobe receiving direction. The reception directivity is, for example, symmetric with respect to the main lobe receiving direction.

The microcomputer 10 controls the phase shifter 16 to adjust the phase of the unprocessed reception signal SRu by a phase adjusting value for each of the antenna elements 15a to 15c. Therefore, the microcomputer 10 controls the main lobe receiving direction of the reception directivity, and the reception array antenna 15 can receive the reflected beam coming from an arbitrary direction ranging within a desired detection area.

More specifically, the radar apparatus 1 sets a detection area ranging from the direction of −90 degrees to the direction of +90 degrees, and performs the scanning operation by using an electronic scanning technique. In this technique, the microcomputer 10 controls the phase sifter 13 to change the main lobe radiation direction of the transmission directivity in the range from the direction of −90 degrees to the direction of +90 degrees. Further, the microcomputer 10 controls the phase shifter 16 such that the main lobe receiving direction of the reception directivity always coincides with the main lobe radiation direction of the transmission directivity. Therefore, the array antenna 15 can receive the reflected beam containing the main lobe reflected from a target at the maximum sensitivity. Thereafter, each time the microcomputer 10 changes the main lobe radiation direction of the transmission directivity, the array antenna 15 receives a reflected beam, the microcomputer 10 produces a reception signal SR from the reflected beam, and the microcomputer 10 judges whether or not the level of the reception signal SR is equal to or larger than a predetermined threshold.

When the reflected beam contains no reflected main lobe, the level of the reception signal SR becomes lower than the threshold. In this case, the microcomputer 10 abandons the signal SR. In contrast, when the reflected beam contains the main lobe reflected from a target, the array antenna 15 receives the reflected main lobe of the reflected beam at the maximum sensitivity, and the microcomputer 10 judges that the level of the reception signal SR is equal to or larger than the predetermined threshold. Therefore, the microcomputer 10 recognizes the detect ion of the target. Then, the microcomputer 10 detects information about the target (e.g., the distance between the radar apparatus 1 and the target and the bearing angle from the radar apparatus 1 to the target) from the phase differences of the unprocessed reception signals Sru. These phase differences are determined from the phase adjusting values set in the phase sifter 16. Therefore, the radar apparatus 1 can search the detection area for the target.

The beam of electromagnetic waves radiated from the transmission array antenna 14 in the transmission directivity has not only the main lobe, transmitted in the main lobe radiation direction, but also a pair of grating lobes (i.e., unnecessary portions) transmitted in grating lobe radiation directions. These grating lobe radiation directions are generally symmetric with respect to the main lobe radiation direction. Therefore, when the main lobe of the radiated electromagnetic waves is reflected from a target, at least one grating lobe of the radiated electromagnetic waves is sometimes reflected from another object. In this case, the reception array antenna 15 receives not only a first beam of electromagnetic waves reflected from the target but also a second beam of electromagnetic waves reflected from the object. When the intensity of the second beam is sufficiently large as compared with the intensity of the first beam, phase differences of the unprocessed reception signals SRu formed from, the reflected beams in the array antenna 15 do not precisely indicate the information about the target. Therefore, it is difficult to precisely detect the target from the beams.

Figure 2:
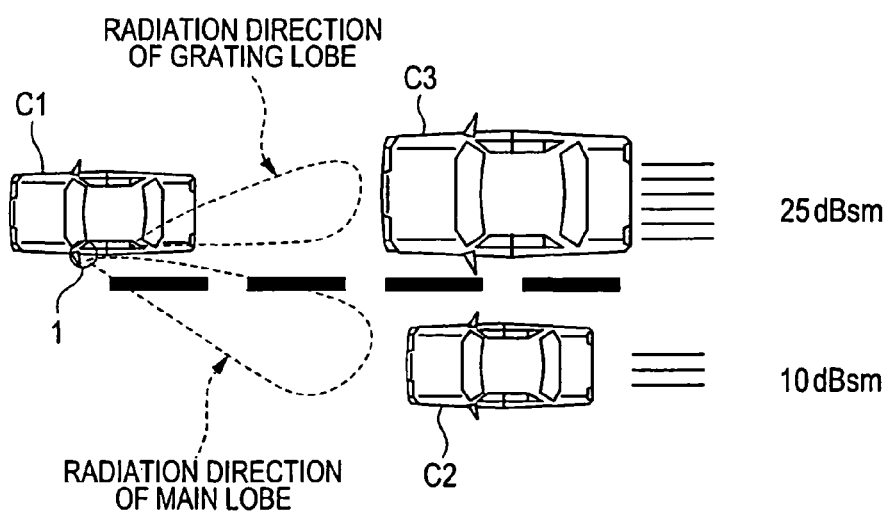
FIG. 2 is a view schematically showing a main lobe and a grating lobe of electromagnetic waves radiated from the radar apparatus shown in FIG. 1.

This situation will be described in more detail with reference to FIG. 2. FIG. 2 is a view schematically showing the main lobe and one grating lobe of radiated electromagnetic waves. As shown in FIG. 2, the radar apparatus 1 is, for example, mounted on a remarked vehicle C1, and both a small-sized vehicle (e.g., a passenger car) C2 and a large-sized vehicle (e.g., a truck) C3 are located in the forward or backward direction of the remarked vehicle. The small-sized vehicle C2 has a small radar cross section (RCS) equal to 10 dBsm and reflects the main lobe of the radiated electromagnetic waves. The large-sized vehicle C3 has a large RCS equal to 25 dBsm and reflects one grating lobe of the radiated electromagnetic waves. When the intensity of the main lobe is not sufficiently larger than the intensity of the grating lobe, the intensity of the grating lobe coming from the grating lobe radiation direction of the array antenna 15 sometimes becomes larger than the intensity of the main lobe coming from the main lobe radiation direction of the array antenna 15. In this case, assuming that an array antenna system is mounted on the vehicle C1, this system sometimes misjudges that a target exists in the grating lobe radiation direction.

To reliably detect a target existing in the main lobe radiation direction, it is required to set the desired-to-undesired signal ratio (i.e., the ratio of the intensity of the main lobe to the intensity of the grating lobe in the production of the reception signal SR) at one hundred or more equivalent to 20 dB or more. Although the array antenna system in the prior art can set the desired-to-undesired signal ratio at $10^{15/10}$ or more equivalent to 15 dB or more by reducing the intensity of the grating lobe received in a reception array antenna, the ratio obtained in the prior art is still insufficient.

Figure 3:
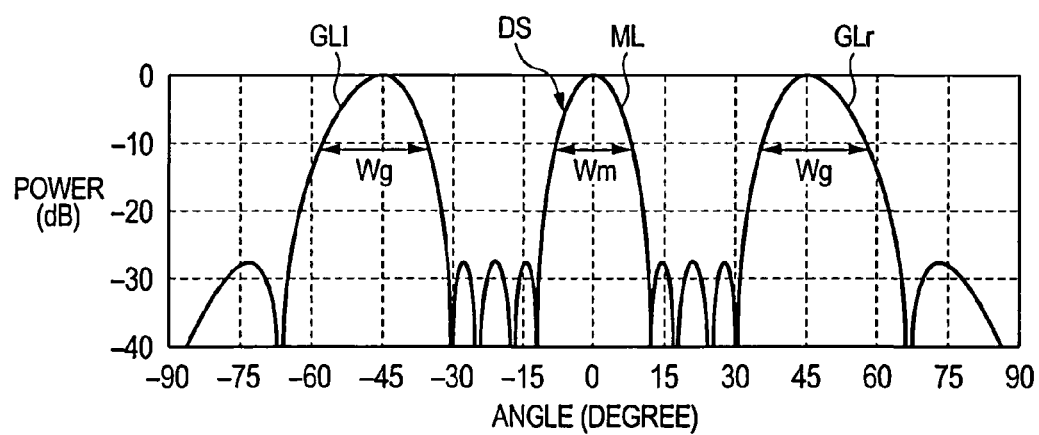
FIG. 3 is a view showing a transmission directivity of a transmission array antenna of the radar apparatus.

FIG. 3 is a view showing the transmission directivity DS of the transmission array antenna 14.

The transmission directivity DS shown in FIG. 3 is, for example, obtained in the zero-degree scanning performed in the radar apparatus 1, and the radiation direction of the main lobe ML is set at zero degree. The main lobe ML has a peak intensity equivalent to 0 dB in the main lobe radiation direction, and the intensity of the main lobe ML is reduced to −10 dB (i.e., almost one-tenth of its peak intensity) in directions different from the main lobe radiation direction by ±7 degrees. Therefore, the main lobe ML has a main lobe width Wm of almost 14 degrees which ranges from the direction of −7 degree to the direction of +7 degree in the zero-degree scanning.

Further, the transmission beam has a pair of grating lobes GLl and GLr having peak intensities in grating lobe radiation directions. These grating lobe radiation directions are, for example, different from the main lobe radiation direction by ±45 degrees. Therefore, the grating lobes GLl and GLr of the electromagnetic waves are, respectively, radiated in the grating lobe radiation directions (e.g., directions of ±45 degrees in the zero-degree scanning). The peak intensities of the grating lobes GLl and GLr are almost equal to the peak intensity of the main lobe ML. The intensity of the grating lobe GLl is reduced to −10 dB (i.e., almost one-tenth of its peak intensity) in directions different from its grating lobe radiation direction by ±10 degrees (e.g., directions of −35 degrees and −55 degrees in the zero-degree scanning). Therefore, the grating lobe GLl has a radiation area set at a grating lobe width Wg of almost 20 degrees. The radiation area of the grating lobe GLl is placed in the direction range between directions different from the main lobe radiation direction by −35 degrees and −55 degrees. In the same manner, the grating lobe GLr has a radiation area set at a grating lobe width Wg of almost 20 degrees. The radiation area of the grating lobe GLr is placed in the direction range between directions different from the main lobe radiation direction by +35 degrees and +55 degrees. In the zero-degree scanning, the radiation area of the grating lobe GLl ranges from the direction of −35 degrees to the direction of −55 degrees, and the radiation area of the grating lobe GLr ranges from the direction of +35 degrees to the direction of +55 degrees.

In this embodiment, although the microcomputer 10 changes the main lobe radiation direction of the radiation directivity DS to search the detection area for a target, the microcomputer 10 fixes the power pattern of the radiation directivity DS set in the transmission array antenna 14 to use the array antenna 14 as a grating lobe suppressed antenna. In contrast, the microcomputer 10 sets the reception array antenna 15 in a plurality of reception directivities (or with a plurality of reception directivity patterns) one after another to use the array antenna 15 as a grating lobe suppressing antenna. Therefore, the array antenna 14 radiates the whole grating lobes GLl and GLr with the main lobe ML. When a target and objects exist in the detection area, the array antenna 15 set in one of the reception directivities can receive the main lobe ML reflected from the target and the grating lobes GLl and GLr reflected from the objects while preventing the reception of a portion of each grating lobe.

More specifically, each time the microcomputer 10 changeably sets the array antenna 15 in one of the reception directivities, the microcomputer 10 changes the main lobe radiation direction of the transmission directivity DS in the detection area. Each reception directivity has a first null point setting area corresponding to the radiation area of the grating lobe GLl in the transmission directivity DR, and a second null point setting area corresponding to the radiation area of the grating lobe GLr in the transmission directivity. Because the main lobe receiving direction of each reception directivity is set so as to always coincide with the main lobe radiation direction of the transmission directivity, the reception directivity has a grating lobe receiving area of which directions always coincide with directions of the radiation area of each grating lobe. The grating lobe receiving areas of the reception directivity are set as the first and second null point setting areas.

The directional width of the first null point setting area in the reception directivity is equal to the width of the radiation area of the grating lobe GLl in the transmission directivity DR, and the directional width of the second null point setting area in the reception directivity is equal to the width of the radiation area of the grating lobe GLr in the transmission directivity DR. Each reception directivity has a null point at a first null point angle of the first null point setting area and another null point at a second null point angle of the second null point setting area. The first null point angles of the respective reception directivities are differentiated from one another, and the second null point angles of the respective reception directivities are differentiated from one another. For example, the first null point angles are set at equal intervals in the first null point setting area, and the second null point angles are set at equal intervals in the second null point setting area.

The sensitivity of the array antenna 15 to electromagnetic waves coming from a null area around the direction of each null point angle is extremely reduced. Therefore, even when at least one whole grating lobe GLl or GLr reflected from an object is incident on the array antenna 15, the array antenna 15 substantially receives neither a portion of the grating lobe GLl coming from a first null area around the first null point angle nor a portion of the grating lobe GLr coming from a second null area around the second null point angle.

Further, the null areas of the reception directivities corresponding to each grating lobe overlap with one another and cover the whole null point setting area common to the reception directivities. Therefore, the average of sensitivities set in the reception directivities is sufficiently low in any direction of the null point setting area.

Then, each time the microcomputer 10 sets the array antenna 15 in one reception directivity, the microcomputer 10 changes the main lobe radiation direction of the transmission directivity DS while changing the main lobe receiving direction of the reception directivity so as to coincide with the main lobe radiation direction. When the main lobe is reflected from a target, this reflected main lobe is received at the maximum sensitivity in the array antenna 15.

The microcomputer 10 produces a reception signal SR each time the main lobe radiation direction of the transmission directivity DS is changed by a predetermined angle. Therefore, when the main lobe radiation direction is set such that the main lobe is reflected from a target, the reflected main lobe is received in the array antenna 15 at the maximum sensitivity. The reception signal SR produced from the reflected main lobe has the maximum level or a sufficiently-high level among the reception signals SR produced during the scanning performed when the array antenna 15 is set in one reception directivity. The microcomputer 10 selects this reception signal SR having the maximum level each time the array antenna 15 is set in one reception directivity.

When the main lobe reflected from the target is incident on the array antenna 15, at least one grating lobe GLl or GLr reflected from an object is sometimes incident on the array antenna 15. In this case, the array antenna 15 does not receive a portion of the grating lobe corresponding to a directional area around the null point angle of the reception directivity, and the array antenna 15 receives the other portion of the grating lobe. The received portion of the grating lobe is contained in each selected reception signal SR.

Then, after the microcomputer 10 sets the array antenna 15 in the reception directivities one after another, the microcomputer 10 determines an average of the selected reception signals SR corresponding to the reception directivities. Because the null point angles of the reception directivities are differentiated, influence of the grating lobe is considerably suppressed in this average. Then, the microcomputer 10 detects information about the target from the average of the reception signals RS. In this case, although influence of the grating lobes GLl and GLr on each selected reception signal SR is not sufficiently suppressed, influence of the grating lobes GLl and GLr on the average of the selected reception signals RS is sufficiently suppressed.

Accordingly, the microcomputer 10 can detect the target from the average of the selected reception signals RS having sufficiently-high levels with high precision.

Figure 4:
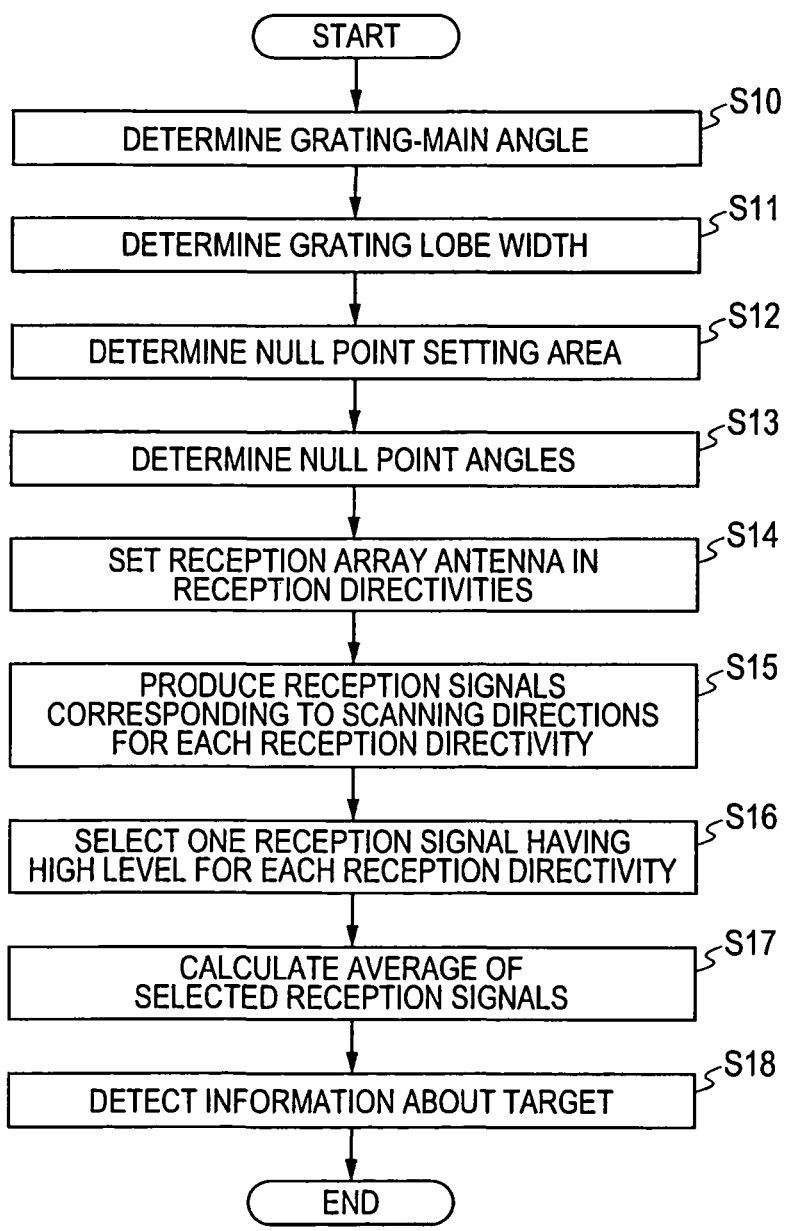
FIG. 4 is a flow chart showing a grating lobe suppressing process performed in a microcomputer of the radar apparatus according to the first embodiment.
Figure 5:
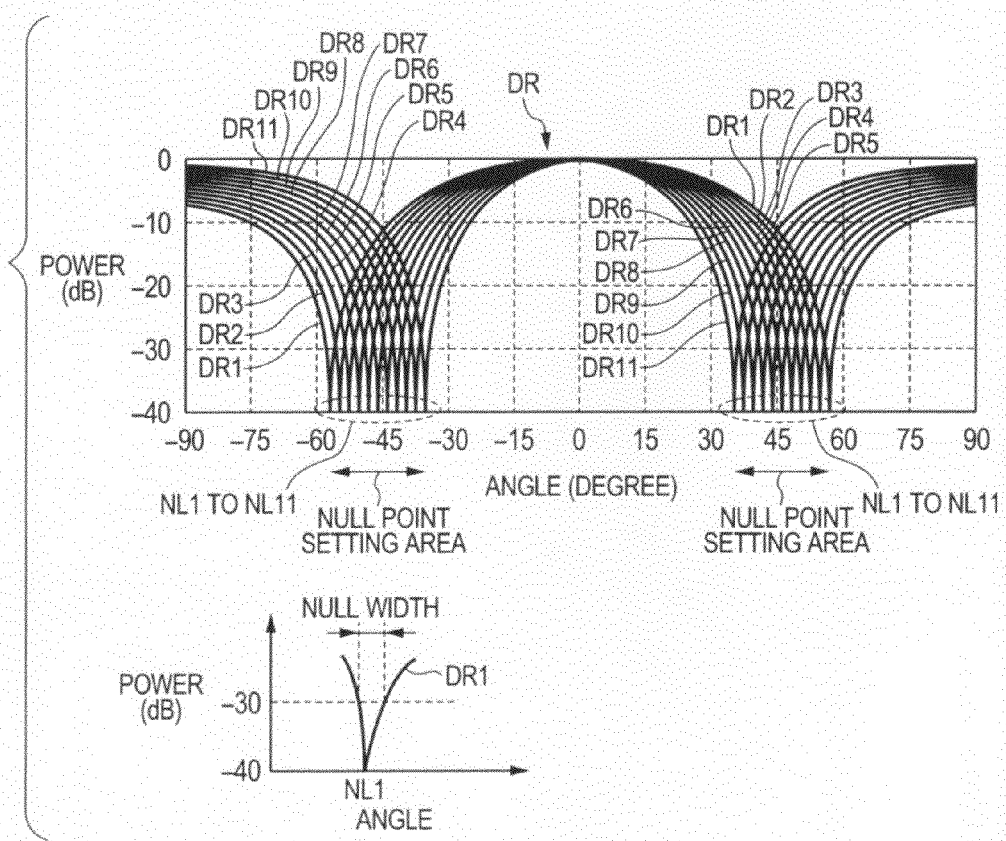
FIG. 5 is a view showing eleven reception directivities set in a reception array antenna of the radar apparatus one after another.

The grating lobe suppressing process performed in the microcomputer 10 will be described with reference to FIG. 4 and FIG. 5. FIG. 4 is a flow chart showing the grating lobe suppressing process. In this process, only the grating lobe GLl is suppressed. However, the grating lobe GLr is also suppressed in the same manner. FIG. 5 is a view showing eleven reception directivities DR (DR1 to DR11) set one after another for the array antenna 15. Each reception directivity DR is expressed by a sensitivity pattern. However, the reception directivity DR can also be expressed by a power pattern of electromagnetic waves, uniformly propagated in all directions and received in the array antenna 15, with respect to the incident direction (or angle) of the received electromagnetic waves. Further, the reception directivities DR in the zero-degree scanning are shown in FIG. 5 as an example. Therefore, each reception directivity DR has the maximum reception sensitivity (i.e., the maximum power) in the direction of zero degree.

As shown in FIG. 4, at step S10, the microcomputer 10 determines a grating-main angle between the main lobe radiation direction and the radiation direction Dg of the grating lobe GL1 in the transmission directivity DS. This angle is determined from the arrangement (e.g., the intervals) of the transmission antenna elements 14a to 14e. For example, as shown in FIG. 3, when the main lobe of the electromagnetic waves radiated from the array antenna 14 has the peak intensity in the radiation direction of zero degree, the grating lobe GL1 radiated from the array antenna 14 has the peak intensity in the direction of −45 degrees. Therefore, the microcomputer 10 sets the grating-main angle corresponding to the grating lobe GL1 at −45 degrees.

At step S11, the microcomputer 10 determines the width of the radiation area of the grating lobe GL1 as the grating lobe width Wg. For example, as shown in FIG. 3, when the grating lobe GL1 has the peak intensity at the radiation direction Dg of −45 degrees, the intensity of the grating lobe GL1 is reduced to −10 dB (i.e., one-tenth of the peak intensity) in directions of −35 degrees and −55 degrees. Therefore, because the grating lobe radiation area of the grating lobe GL1 has the width of 20 degrees ranging from the direction of −35 degrees to the direction of −55 degrees, the microcomputer 10 sets the grating lobe width Wg of 20 degrees.

At step S12, the microcomputer 10 determines a null point setting area. This null point setting area is common to the reception directivities DR planned to be set in the reception array antenna 15. More specifically, each reception directivity DR has the maximum sensitivity in a main lobe receiving direction. When the main lobe reflected from a target is incident on the array antenna 15 from the main lobe receiving direction coinciding with the radiation direction of the main lobe ML, the array antenna 15 can receive the main lobe of the reflected beam at the maximum sensitivity. The direction of the grating-main angle is set as the direction of the center of the null point setting area. The grating lobe width Wg is set as the width of the null point setting area. Therefore, when the grating lobe GL1 reflected from an object is incident on the array antenna 15, the array antenna 15 receives the grating lobe GL1 of the reflected beam at the sensitivity set in the null point setting area.

For example, as shown in FIG. 3, the radiation area of the grating lobe GL1 ranges from the direction of −35 degrees to the direction of −55 degrees in the transmission directivity DS, and the radiation area of the grating lobe GLr ranges from the direction of +35 degrees to the direction of +55 degrees in the transmission directivity DS. Therefore, as shown in FIG. 5, when the main lobe receiving direction is set at zero degree, the null point setting area corresponding to the grating lobe GL1 is set in the directional area ranging from the direction of −35 degrees to the direction of −55 degrees, and the null point setting area corresponding to the grating lobe GLr is set in the directional area ranging from the direction of +35 degrees to the direction of +55 degrees.

At step S13, the microcomputer 10 determines a predetermined number of null point angles set at equal intervals in the null point setting area. More specifically, because the radiation area of the grating lobe GL1 in the transmission directivity DS ranges from the direction of Dg−Wg/2 degrees to the direction of Dg+Wg/2 degrees, a plurality of null point angles are set in the null point setting area, ranging from the direction of Dg−Wg/2 degrees to the direction of Dg+Wg/2 degrees, so as to be differentiated from one another.

In the example shown in FIG. 5, the microcomputer 10 determines eleven null point angles at equal intervals in one null point setting area (i.e., the area ranging from the direction of Dg−Wg/2 degrees to the direction of Dg+Wg/2 degrees) corresponding to the grating lobe GL1 and other eleven null point angles at equal intervals in another null point setting area (i.e., the area ranging from the direction of −Dg−Wg/2 degrees to the direction of −Dg+Wg/2 degrees) corresponding to the grating lobe GLr.

At step S14, the microcomputer 10 sets the reception array antenna 15 in a plurality of reception directivities DR one after another. Each reception directivity DR has a null point in the direction of one determined null point angle corresponding to the grating lobe GL1, and the null point angles of the reception directivities DR corresponding to the grating lobe GL1 are differentiated from one another. More specifically, to set each reception directivity DR having two null points corresponding to the grating lobes GL1 and GLr at two null point angles, the microcomputer 10 determines phase adjusting values of the reception antenna elements 15a to 15c from the null point angles and controls the phase shifter 16 to adjust phases of the unprocessed reception signals Sru, formed in the reception antenna elements 15a to 15c, by the determined phase adjusting values. In other words, each time phases of the unprocessed reception signals SRu are adjusted according to the null point angles, the reception array antenna 15 is set in the reception directivity DR.

Therefore, each time the microcomputer 10 controls the phase shifter 16 on the basis of the null point angles, one reception directivity DR is set so as to have two null points corresponding to the grating lobes GL1 and GLr. The sensitivity to electromagnetic waves in each reception directivity DR is extremely reduced around the directions of the null point angles.

In the example shown in FIG. 5, the microcomputer 10 sets the array antenna 15 in eleven reception directivities DRi (i=1 to 11) one after another. Each reception directivity DRi has a first null point NLi corresponding to the grating lobe GL1 and a second null point NLi corresponding to the grating lobe GLr. The positions of the null points NLi (e.g., NL1, NL2, NL3, NL4, NL5, NL6, NL7, NL8, NL9, NL10 and NL11) corresponding to each grating lobe in the reception directivities DRi are differentiated from one another in the null point setting area.

In this case, each reception directivity DR has the minimum reception sensitivity in two directions of two null point angles corresponding to the grating lobes GL1 and GLr, and the minimum reception sensitivity is equal to −40 dB (i.e., $1/10^4$ of the maximum sensitivity). Further, each reception directivity DR has a reduced reception sensitivity, equal to or smaller than −30 dB (i.e., $1/10^3$ of the maximum sensitivity), in the null area around each of two null point angles. This null area has a width of almost 3 degrees. This null width is narrower than the width Wg (e.g., 20 degrees) of the grating lobes GL1 and GLr. The null areas of the reception directivities DR overlap with one another in each null point setting area.

Therefore, the array antenna 15 can receive the main globe ML, reflected from a target, at the maximum sensitivity. In contrast, because each reception directivity DR has the reduced reception sensitivity in the null area corresponding to a portion of the grating lobe GL1 and the null area corresponding to a portion of the grating lobe GLr, the electromagnetic waves received in the array antenna 15 substantially lacks the portion of the grating lobe GL1 and the portion of the grating lobe GLr.

Each reception directivity DR is, for example, formed to be symmetric with respect to the main lobe receiving direction. In the case of Dg=−45 and Wg=20 shown in FIG. 3, the null point angles are set at equal intervals of 2 degrees, each null point NLi corresponding to the grating lobe GL1 is placed at −55+2(i−1) degrees, and each null point NLi corresponding to the grating lobe GLr is placed at 55−2(i−1) degrees.

At step S15, each time the microcomputer 10 sets one reception directivity DR, having a first null point NL corresponding to the grating lobe GR1 and a second null point NL corresponding to the grating lobe GLr, in the array antenna 15, the microcomputer 10 produces a plurality of reception signals SR corresponding to scanning directions covering the detection area.

At step S16, the microcomputer 10 selects one reception signal SR having a sufficiently high level from the reception signals SR corresponding to one reception directivity DR for each reception directivity.

More specifically, the microcomputer 10 controls the phase shifters 13 and 16 to perform the scanning of the whole detection area ranging from the direction of −90 degrees to the direction of +90 degree. In this scanning, the main lobe radiation direction of the transmission directivity DS coincides with the main lobe receiving direction of the reception directivity DR. Each time the main lobe radiation direction is changed by a predetermined angle in the scanning, the microcomputer 10 produces one reception signal SR from the received electromagnetic waves. When the main lobe is reflected from a target, the reflected main lobe is received at the maximum sensitivity of the reception directivity DR, and only the reception signal SR produced from the reflected main lobe ML has a level equal to or larger than a predetermined threshold. Therefore, the microcomputer 10 selects this reception signal SR.

Therefore, when the array antenna 15 is set in a plurality of reception directivities DR one after another, the microcomputer 10 selects a plurality of reception signals SR corresponding to the reception directivities DR. The electromagnetic waves, containing the reflected main lobe ML, sometimes contains the grating lobes GL1 and GLr reflected from objects while substantially lacking a portion of the grating lobe GL1 corresponding to the first null point and a portion of the grating lobe GLr corresponding to the second null point. Therefore, this selected reception signal SR substantially has no signal components derived from the portions of the grating lobes GL1 and GLr.

The radar apparatus 1 receives the electromagnetic waves, transmitted from the array antenna 14 in the transmission directivity DS and reflected from a target or object, in the array antenna 15 in one of the reception directivities DR (e.g., DR1 to DR11). Both of the transmission directivity DS and one reception directivity DR are combined into a transmission-reception composite directivity DSR. Assuming that electromagnetic waves having the same power pattern as the power pattern of the transmission directivity DS are incident on the reception array antenna 15 set in one reception directivity DR, the electromagnetic waves received in the antenna 15 has the same power pattern as the power pattern of the transmission-reception composite directivity DSR.

Figure 6:
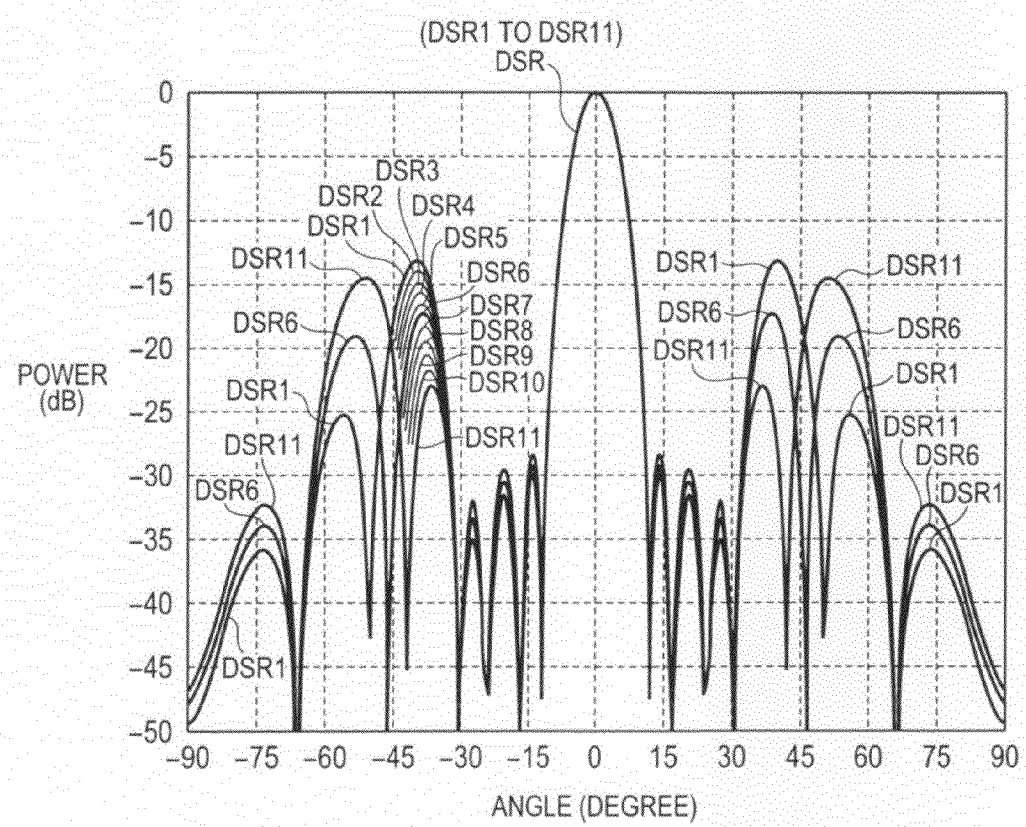
FIG. 6 is a view showing eleven transmission-reception composite directivities corresponding to the respective reception directivities.

FIG. 6 is a view showing eleven transmission-reception composite directivities DSR (DSR1 to DSR11) corresponding to the respective reception directivities DR.

Each directivity DSR is expressed by the power ratio. As shown in FIG. 6, each transmission-reception composite directivity DSR is characterized in that the power ratio in the directivity DSR is equal to the product of the power ratio in the transmission directivity DS and the power ratio in the corresponding reception directivity DR.

The power ratio of the transmission-reception composite directivity DSRi is maximized at a direction corresponding to the main lobe radiation direction and the main lobe receiving direction, while the power ratio in a null area of the directivity DSRi corresponding to each null area of the reception directivity DRi is suppressed. The null areas of the directivity DSRi corresponding to the different null areas of the directivities DRi also differ from one another. Therefore, none of the whole grating lobe GL1 and the whole grating lobe GLr is suppressed in any directivity DSR. In other words, influence of the grating lobes ML1 and MLr on each of the reception signals SRi is insufficiently suppressed. However, a portion of the grating lobe GL1 and a portion of the grating lobe GLr are suppressed in each directivity DSR.

Then, at step S17, the microcomputer 10 performs the averaging for the selected reception signals SR each of which has the sufficiently high level. More specifically, each time the microcomputer 10 selects one reception signal SR produced from the received electromagnetic waves, the microcomputer 10 stores the selected reception signal SR in the RAM or the like. Therefore, when the microcomputer 10 sets the null points NLi (e.g., NL1 to NL11) one after another, the selected reception signals SRi (e.g., SR1 to SR11) are stored in the microcomputer 10. Then, the microcomputer 10 calculates the average of the selected reception signals SRi to produce an averaged reception signal SRav.

Assuming that electromagnetic waves containing the main lobe ML reflected from a target are received in the array antenna 15 set in the averaged reception directivity denoting the average of the reception directivities DRi (e.g., DR1 to DR11), a reception signal produced from the received electromagnetic waves has the same level pattern as the level pattern of the averaged reception signal SRav.

Further, assuming that electromagnetic waves having the same power pattern as the power pattern of the transmission directivity DS is received at the array antenna 15 set in the averaged reception directivity, electromagnetic waves received in the array antenna 15 have the same power pattern as the power pattern of an average transmission-reception composite directivity Dav denoting the average of the transmission-reception composite directivities DSRi (e.g., DSR1 to DSR11). transmission-reception composite directivity Dav.

Figure 7:
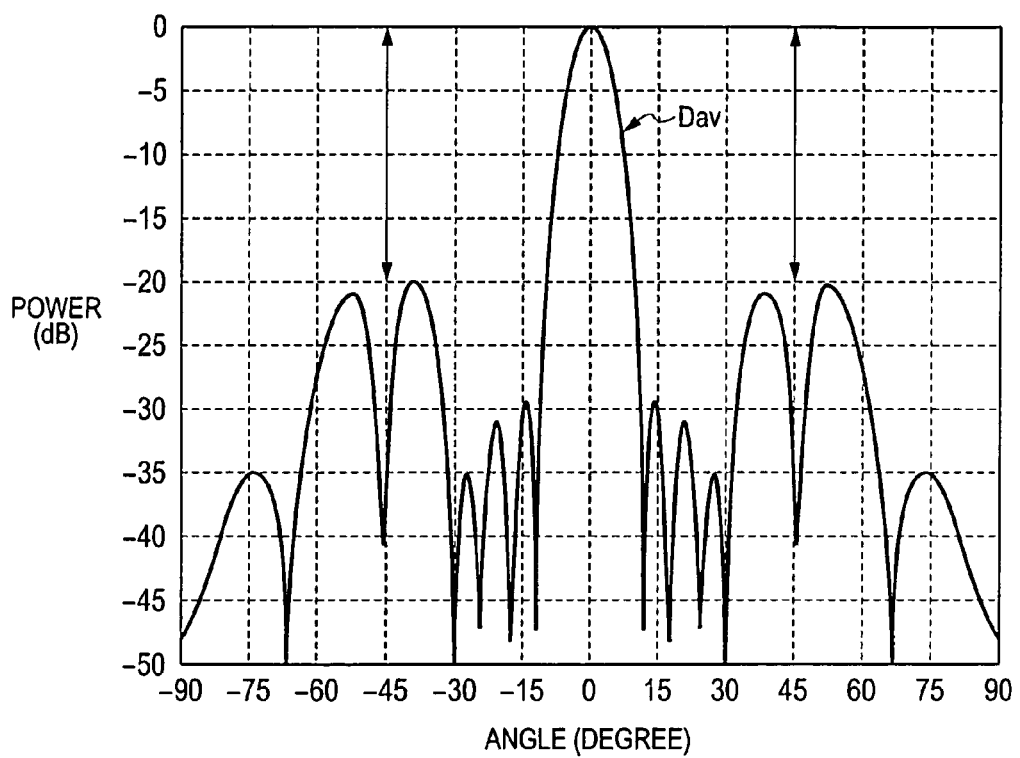
FIG. 7 is a view showing an average transmission-reception composite directivity obtained by averaging the transmission-reception composite directivities according to the first embodiment.

FIG. 7 is a view showing the average transmission-reception composite directivity Dav obtained by averaging the directivities DSRi according to the first embodiment. As shown in FIG. 7, the intensity of the received electromagnetic waves (or the sensitivity to electromagnetic waves) in the average transmission-reception composite directivity Dav is suppressed in the same areas as the whole radiation areas (i.e., the radiation area ranging from degrees to −55 degrees and the radiation area ranging from 35 degrees to 55 degrees) of the grating lobes GL1 and GLr of the radiated electromagnetic waves. More specifically, in the average transmission-reception composite directivity Dav, the intensity of the received electromagnetic waves in the same areas as the whole radiation areas of the grating lobes GL1 and GLr is reduced to −20 dB or less (i.e., one-hundredth or less of the maximum intensity) in the same direction as the main lobe radiation direction.

Therefore, when the main lobe ML of the transmission beam is reflected on a target, the array antenna 15 receives the reflected main lobe ML at the maximum intensity. In this case, even when the grating lobe GL1 or GLr of the transmission beam is reflected from an object, the intensity of the reflected grating lobe GL1 or GLr, contained in the received electromagnetic waves, can be substantially reduced to −20 dB or less (i.e., one-hundredth or less of the intensity of the main lobe ML). This means that the received electromagnetic waves used for the production of the averaged reception signal SRav substantially contain no grating lobe but contain only the main lobe ML.

Then, at step S18, the microcomputer 10 detects information about the target from the averaged reception signal SRav.

Accordingly, even when the null width (e.g., 3 degrees) in the reception directivity DR is narrower than the width Wg (e.g., Wg=20 degrees) of the grating lobes GL1 and GLr, the microcomputer 10 can produce the averaged reception signal SRav from the received electromagnetic waves, substantially containing only the main lobe ML reflected by a target, while sufficiently suppressing the influence of the grating lobes GL1 and GLr, reflected from objects, on the averaged reception signal SRav. That is, the radar apparatus 1 can enhance the precision in the detection of the target placed in the detection area.

In this embodiment, the radiation area of the grating lobe GL1 is determined such that the intensity of the grating lobe GL1 in the radiation area is equal to or higher than one-tenth of the highest intensity of the grating lobe GL1, and the null points NL are set in the reception area of the grating lobe GL1 having the same direction range as the direction range of the radiation area of the grating lobe GL1. Therefore, the null points NL are placed in the null point area having the same width as the width of the radiation area of the grating lobe GL1. Assuming that the null points NL are placed in the null point area wider than the width of the radiation area of the grating lobe GL1, the grating lobe GL1 radiated from the array antenna 14 sometimes interferes with the main lobe ML received in the array antenna 15. This interference depends on the configuration of the array antenna 14 and the configuration of the array antenna 15 (especially, the area of the array antenna 14 and the area of the array antenna 15). In this case, the intensity of the grating lobe GL1 received in the transmission-reception composite directivity DSR is sometimes increased. However, in this embodiment, because the null points NL are placed in the null point area having the same width as the width of the radiation area of the grating lobe GL1, the increase of the intensity of the grating lobe GL1 received in the transmission-reception composite directivity DSR can be prevented.

Further, in this embodiment, each reception directivity DR has two null points corresponding to the grating lobes GL1 and GLr to be symmetric with respect to the main globe receiving direction. However, each reception directivity DR may have two null points to be asymmetric with respect to the main globe receiving direction.

Modification of First Embodiment

In the first embodiment, as shown in FIG. 2, even when at least one object C3 exists in the detection area with one target C2 so as to reflect one grating lobe of the transmission beam, the radar apparatus 1 detects information about the target. However, when only one target C2 exists in the detection area without any object, the radar apparatus 1 can also detect information about the target by setting the reception directivities DR in the array antenna 15 one after another in the same manner as in the first embodiment.

The grating lobe suppressing process performed in the microcomputer 10 will be described.

When the array antenna 15 is set in one reception directivity DR, the radar apparatus 1 performs the scanning in the detection area while changing the main lobe radiation direction from the direction of −90 degrees to the direction of +90 degrees. When the main lobe ML of the transmission beam is directed toward the target, the main lobe ML is reflected from the target, and the reflected main lobe ML is received in the array antenna 15 at the maximum sensitivity. In contrast, when the main lobe radiation direction is set such that one grating lobe GL1 or GLr is directed toward the target, this grating lobe is reflected from the target, and the array antenna 15 receives the reflected grating lobe while lacking a portion of the grating lobe corresponding to the null area of the reception directivity DR.

Each time the main lobe radiation direction of the transmission directivity DS is changed by a predetermined angle, the microcomputer 1 produces and stores a reception signal SR corresponding to one direction, regardless of the level of the signal. The reception signal SR produced from the main lobe reflected from the target has the maximum level. In contrast, the reception signal SR, obtained when the direction of the null point angle of the reception directivity DR coincides with the direction of the target, has the extremely-reduced level.

The microcomputer 1 calculates a composite reception signal from the reception signals R corresponding to one reception directivity DR. This composite reception signal has a level pattern with respect to the direction defined on the basis of the transmission antenna surface or the reception antenna surface. This level pattern of the composite reception signal is obtained by serially connecting levels of the reception signals R arranged in the order of directions. The level pattern of the composite reception signal is the same as the power pattern of the transmission-reception composite directivity obtained by combining the transmission directivity DS and the reception directivity DR. For example, when the target exists in the direction of zero degree, the composite reception signal corresponding to the reception directivity DRi has the same level pattern as the power pattern of the transmission-reception composite directivity DSRi shown in FIG. 6.

The microcomputer 1 obtains one composite reception signal each time one reception directivity DR is set. Therefore, when the reception directivities DR are set in the array antenna 15 one after another in the same manner as in the first embodiment, the microcomputer 1 produces and stores a plurality of composite reception signals R corresponding to the reception directivities DR. Then, the microcomputer 1 calculates the average of the composite reception signals.

Although influence of the whole grating lobes is not suppressed in each composite reception signal SR, influence of the whole grating lobes is sufficiently suppressed in the average of the composite reception signals. For example, when the target exists in the direction of zero degree, this average has the same level pattern as the power pattern of the average transmission-reception composite directivity Dav shown in FIG. 7.

Accordingly, the radar apparatus 1 can detect information about the target from the average of the composite reception signals R.

Second Embodiment

In the second embodiment, only one target exists in the detection area without any object, and the microcomputer 10 detects information about the target by setting the reception directivities DR in the array antenna 15 one after another in the same manner as in the first embodiment.

The grating lobe suppressing process according to the second embodiment will be described with reference to FIG. 8.

Figure 8:
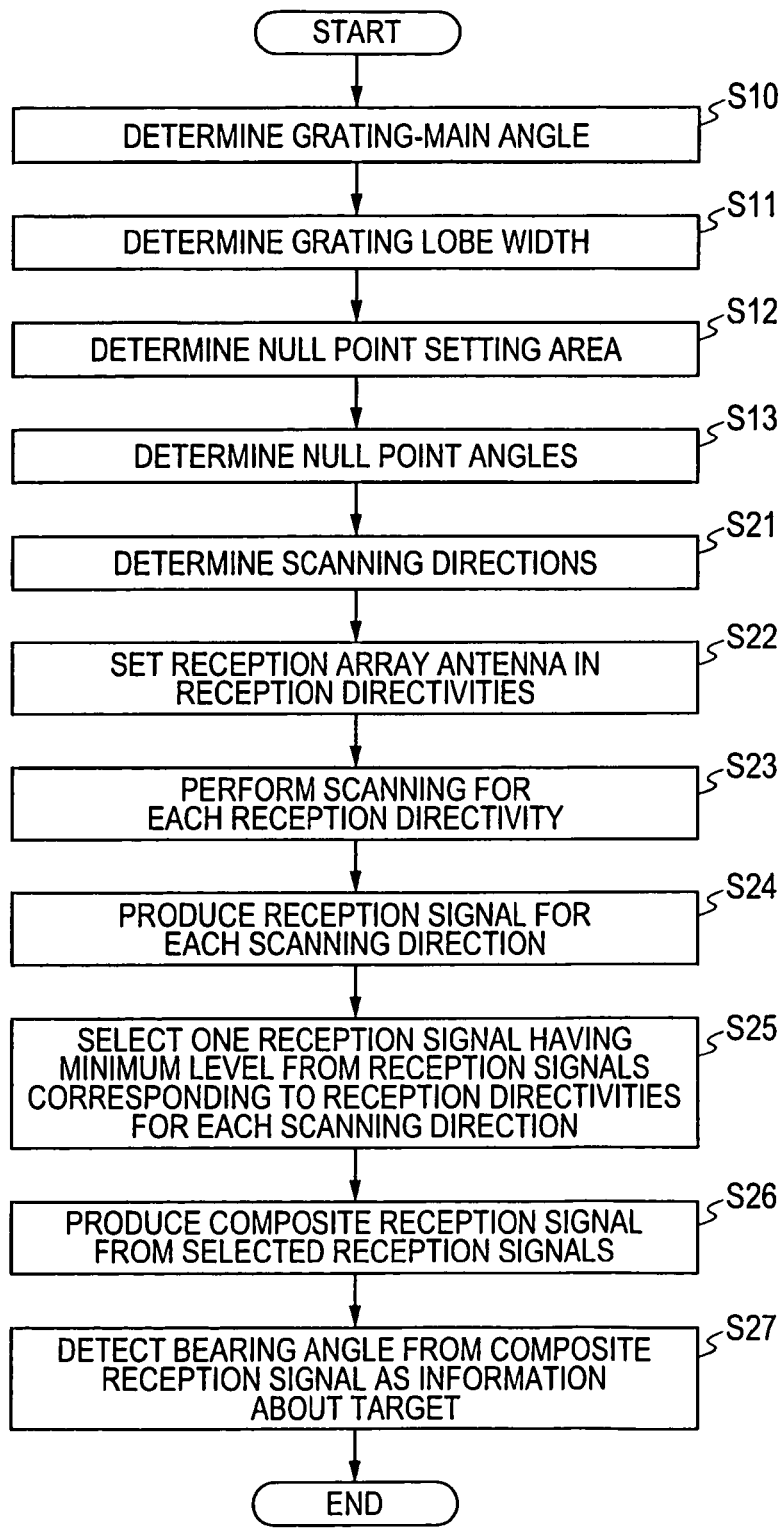
FIG. 8 is a flow chart of a grating lobe suppressing process performed in a microcomputer of the radar apparatus according to the second embodiment.

FIG. 8 is a flow chart of the grating lobe suppressing process performed in the microcomputer 10 according to the second embodiment.

As shown in FIG. 8, after the microcomputer 10 determines the null point angles (step S13), at step S21, the microcomputer 10 determines a plurality of scanning directions ranging from the direction of −90 degrees to the direction of +90 degrees so as to cover the detection area. The scanning directions are, for example, set at equal intervals.

Then, at step S22, the microcomputer 10 sets the reception array antenna 15 in the reception directivities DR one after another.

At step S23, each time the microcomputer 10 sets the array antenna 15 in one reception directivity DR, the microcomputer 10 controls the phase shifters 13 and 16 to perform the scanning for the detection area.

At step S24, each time the main lobe radiation direction of the transmission directivity DS is set at one of the scanning directions, the microcomputer 10 produces and stores a reception signal SR, regardless of the level of the signal, from the electromagnetic waves received in the antenna array 15.

Therefore, the reception signals SR corresponding to the scanning directions are obtained for each of the reception directivities DR. In other words, the reception signals SR corresponding to the reception directivities DR are obtained for each of the scanning directions. The reception signal SR, obtained when the main lobe radiation direction coincides with the direction of the target, has the maximum level. In contrast, the reception signal SR, obtained when the direction of the null point angle of the reception directivity DR coincides with the direction of the target, has the extremely-reduced level.

At step S25, the microcomputer 10 compares levels of the reception signals SR, corresponding to the reception directivities DR and one scanning direction, with one another for each of the scanning directions, and the microcomputer 10 selects one reception signal SR having a minimum level from the reception signals SR corresponding to the reception directivities DR for each scanning direction. Therefore, the selected reception signals SR, corresponding to the scanning directions covering the detection area, are obtained.

At step S26, the microcomputer 10 produces a composite reception signal which is composed of the selected reception signals arranged in the order of the scanning directions. The level pattern of the composite reception signal is the same as the level pattern which is obtained by serially connecting levels of the selected reception signals with one another in the order of the scanning directions. The composite reception signal covers the detection area ranging from the direction of −90 degrees to the direction of +90 degrees.

Figure 9:
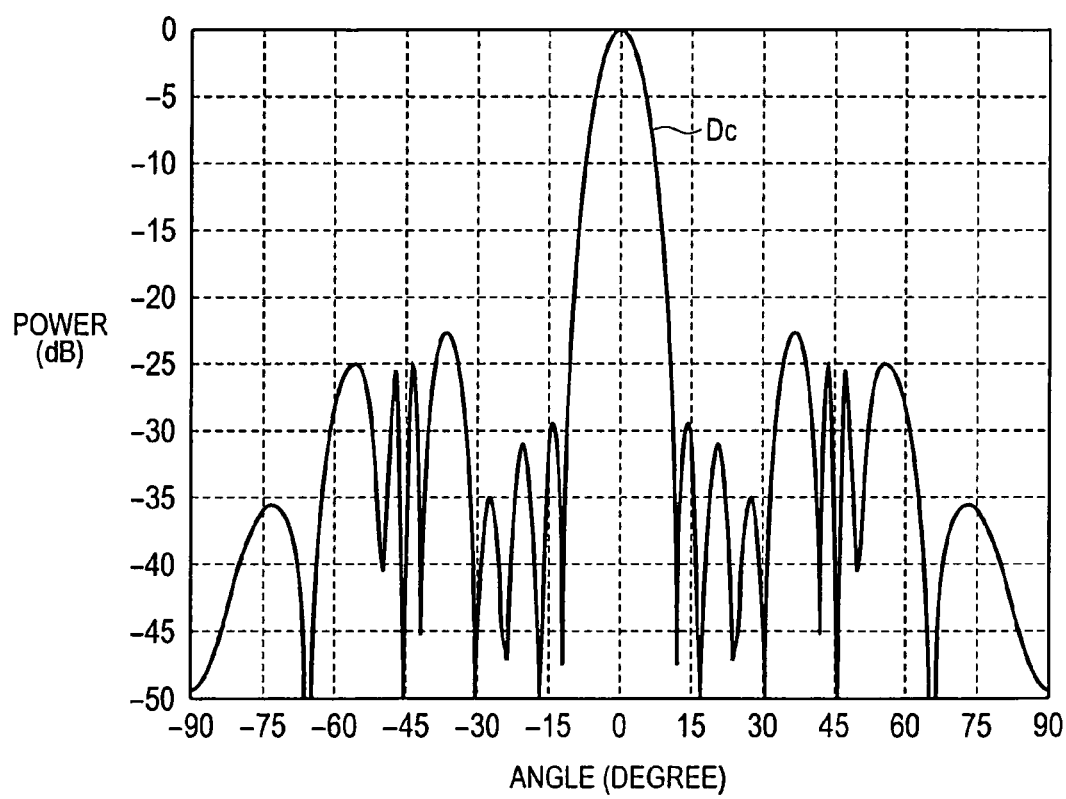
FIG. 9 is a view showing a transmission-reception composite directivity according to the second embodiment.

FIG. 9 is a view showing a combined transmission-reception composite directivity Dc according to the second embodiment. The combined transmission-reception composite directivity Dc shown in FIG. 9 is obtained by selecting one transmission-reception composite directivity DSR having the minimum power value from the directivities DSR1 to DSR11 (see FIG. 6), corresponding to one scanning direction and the directivities of the reception array antenna 15, for each scanning direction. More specifically, power values of the transmission-reception composite directivities DSR1 to DSR11 are compared with one another for each scanning direction, one transmission-reception composite directivity DSR having the minimum power value is selected for each scanning direction, and the selected directivities DSR are connected with one another in the order of the scanning directions. The combined transmission-reception composite directivity Dc is formed of the directivities DSR selected for each scanning direction and connected with one another.

As shown in FIG. 9, the power of the combined transmission-reception composite directivity Dc is suppressed in areas (i.e., the area ranging from −35 degrees to −55 degrees and the radiation area ranging from 35 degrees to 55 degrees) corresponding to the radiation areas of the grating lobes GLl and GLr of the transmission beam. More specifically, the power of the combined transmission-reception composite directivity Dc is reduced to −35 dB or less (i.e., $1/10^{3.5}$ or less of the maximum intensity) in the same directions as the main lobe radiation directions (i.e., directions of ±45 degrees).

The intensity of the received electromagnetic waves forming each reception signal SR is substantially changed in the same pattern as the power pattern of the corresponding transmission-reception composite directivity DSR. Therefore, the composite reception signal obtained from the selected reception signals SR has the same level pattern as the power pattern of a combined transmission-reception composite directivity. For example, when a target exists in the direction of zero degree, the composite reception signal has the same level pattern as the power pattern of the combined transmission-reception composite directivity Dc shown in FIG. 9.

At step S27, the microcomputer 10 detects one scanning direction at which the composite reception signal has the maximum level and judges that a target is located in the detected scanning direction in the detection area.

Therefore, the radar apparatus 1 can detect the bearing angle to the target from the composite reception signal as information about the target. Accordingly, the radar apparatus 1 can further heighten the precision in the detection of information about the target located in the detection area.

Third Embodiment

In the second embodiment, the reception signals SR corresponding to the reception directivities DR are produced each time the main lobe radiation direction of the transmission directivity DS coincides with one scanning direction, the minimum level of one reception signal SR is selected from among levels of the reception signals SR corresponding to the reception directivities DR for each scanning direction, and information about the target is detected from the selected minimum levels. In contrast, in the third embodiment, when only one target exists in the detection area without any object, the microcomputer 10 detects a pattern of levels of the reception signals SR, corresponding to the reception directivities DR and one scanning direction, for each scanning direction, and the microcomputer 10 detects information about the target from the level patterns corresponding to the scanning directions.

Figure 10:
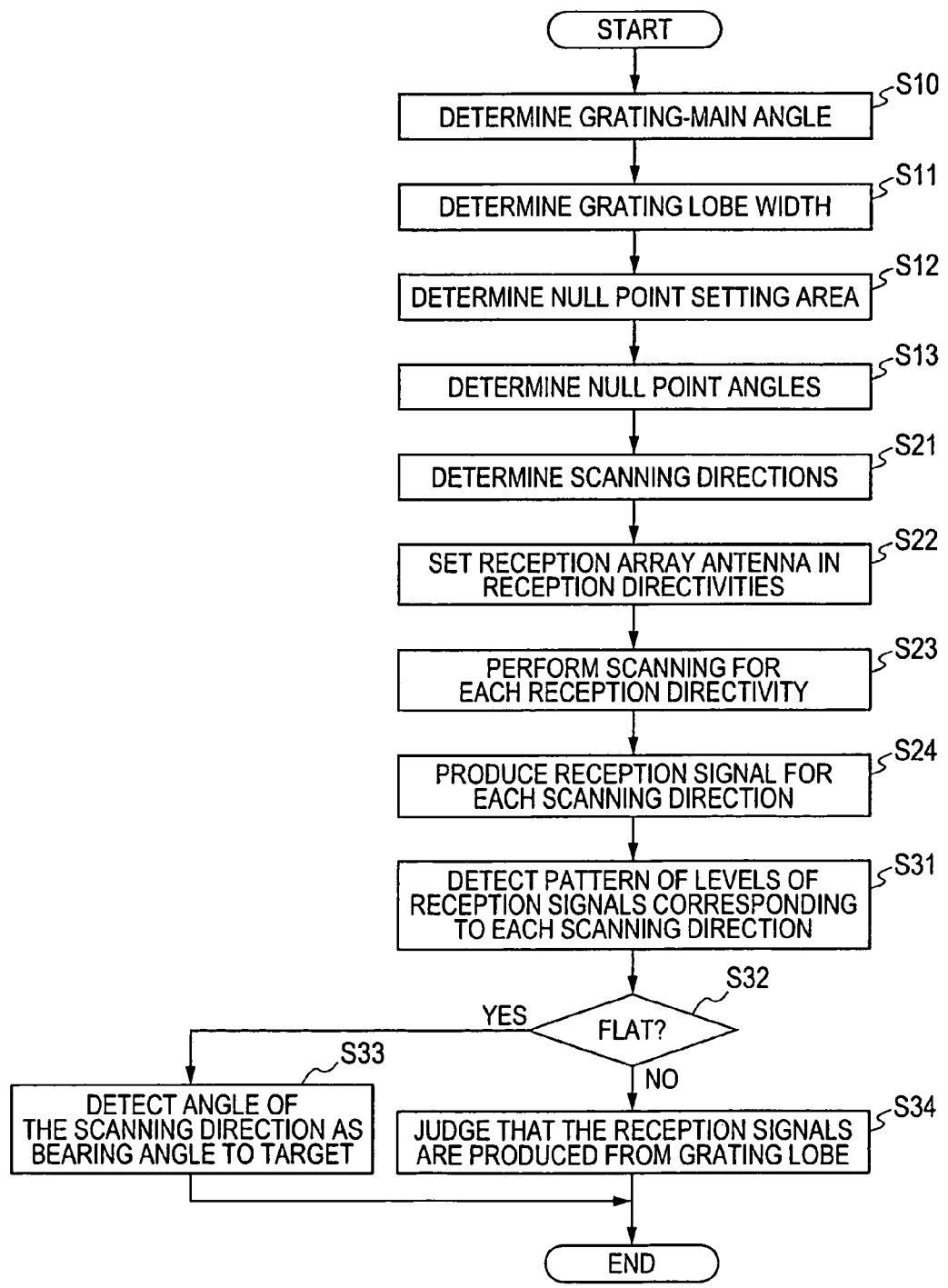
FIG. 10 is a flowchart of a grating lobe suppressing process performed in a microcomputer of the radar apparatus according to the third embodiment.

The grating lobe suppressing process will be described with reference to FIG. 10. FIG. 10 is a flow chart of the grating lobe suppressing process performed in the microcomputer 10 according to the third embodiment.

As shown in FIG. 10, after the reception signals SR corresponding to the reception directivities DR are obtained for each scanning direction (step S24), at step S31, the microcomputer 10 detects a pattern of levels of the reception signals SR, corresponding to one scanning direction, for each scanning direction. For example, the reception signals SR corresponding to the reception directivities DR are arranged in the order of the null points NL arranged in one null point setting area.

At step S32, the microcomputer 10 judges whether or not the level pattern is flat at the high level for each scanning direction. For example, when the reception signals SR corresponding to the reception directivities DR are produced from the main lobe ML reflected from a target, the reception signals SR have the same maximum levels. In contrast, when the reception signals SR corresponding to the reception directivities DR are produced from one grating lobe GL reflected from a target, the level of the reception signal SR is considerably changed with the reception directivity.

Therefore, when the level pattern of the reception signals SR corresponding to one scanning direction is flat at a maximum level, the microcomputer 10 judges that the scanning direction denotes the incoming direction of the main lobe ML reflected from a target. Therefore, at step S33, the radar apparatus 1 detects the angle of the scanning direction, corresponding to the reception signals SR having a flat level pattern at the maximum level, as the bearing angle from the radar apparatus 1 to the target located in the detection area. Therefore, the radar apparatus 1 detects the target located in the scanning direction.

In contrast, when the level of the reception signal SR corresponding to one scanning direction is changed with the reception directivity, at step S34, the microcomputer 10 judges that the reception signals SR corresponding to the scanning direction are produced from one grating lobe reflected from a target. The main lobe radiation direction denoting the scanning direction differs from the radiation direction of the grating lobe by a grating-main angle. Therefore, the radar apparatus 1 detects the target located in a specific direction differing from the scanning direction by the grating-main angle.

Figure 11:
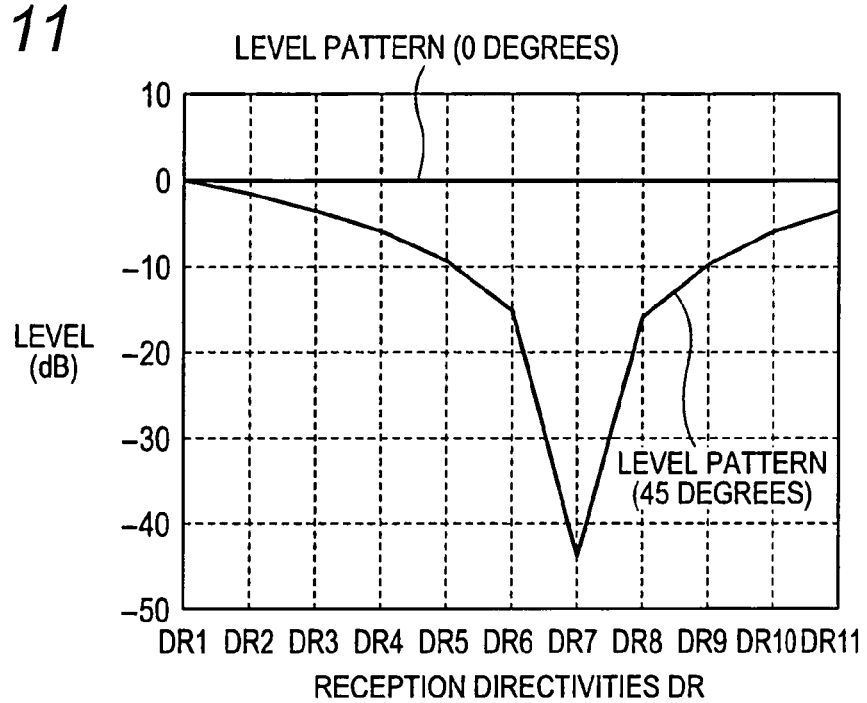
FIG. 11 is a view showing a change of levels of reception signals for each scanning direction according to the third embodiment.

FIG. 11 is a view showing a pattern of levels of the reception signals SR corresponding to each of the scanning directions of zero degree and forty-five degrees according to the third embodiment.

In the example shown in FIG. 11, the level pattern of the reception signals SR corresponding to the reception directivities DR1 to DR11 (see FIG. 5) and the scanning direction of zero degree is flat at a maximum level. Therefore, the microcomputer 10 recognizes that the reception signals SR are produced from electromagnetic waves incoming from the main lobe radiation direction at zero degrees, and the microcomputer 10 judges that a target is located in the direction of zero degrees.

Further, the level of the reception signal SR corresponding to the scanning direction of forty-five degrees is considerably changed with the reception directivity. More specifically, although levels of the reception signals SR corresponding to the reception directivities DR1, DR2 and DR11 are high, the level of the reception signal SR corresponding to the reception directivity DR7 is considerably reduced to $-42$ dB (i.e., $\frac{1}{10^{4.2}}$ of the highest level of the reception signal SR). In this case, the microcomputer 10 recognizes that the reception signals SR corresponding to the scanning direction of forty-five degrees are produced from one grating lobe. Therefore, the microcomputer 10 judges that a target is located in a specific direction different from the direction of forty-five degrees by the grating-main angle of forty-five degrees.

Accordingly, the radar apparatus 1 can reliably detect the target located in the detection area with high precision.

Modifications

In the first to third embodiments, the transmission array antenna 14 is used as a grating lobe suppressed antenna so as to radiate the whole grating lobes GL1 and GLr with the main lobe ML, and the reception array antenna 15 is used as a grating lobe suppressing antenna to allow the reception of the grating lobe GL1 or GLr reflected by an object while preventing the reception of a portion of the grating lobe. However, the microcomputer 10 may set the array antenna 14 in a plurality of transmission directivities DS one after another such that each transmission directivity DS has a null point at a first null point angle of a first null point setting area, corresponding to the reception area of the grating lobe GL1 in the reception directivity DR, and another null point at a second null point angle of a second null point setting area corresponding to the reception area of the grating lobe GLr in the reception directivity DR. The first null point angles of the respective transmission directivities DS are differentiated from one another, and the second null point angles of the respective transmission directivities DS are differentiated from one another.

Therefore, the transmission array antenna 14 is used as a grating lobe suppressing antenna and radiates the grating lobes GL1 and GLr with the main lobe ML while lacking a portion of the grating lobe GL1 corresponding to one null point and a portion of the grating lobe GLr corresponding to another null point. In this case, the reception array antenna 14 is used as a grating lobe suppressed antenna and can receive the grating lobes GL1 and GLr, lacking the portions, with the main lobe ML reflected from a target.

Further, the grating lobe suppressed antenna and the grating lobe suppressing antenna may be set on the basis of an open width of the array antenna. More specifically, the array antenna having a narrow open width is set as a grating lobe suppressing antenna, and the array antenna having a wide open width is set as a grating lobe suppressed antenna.

Figure 12:
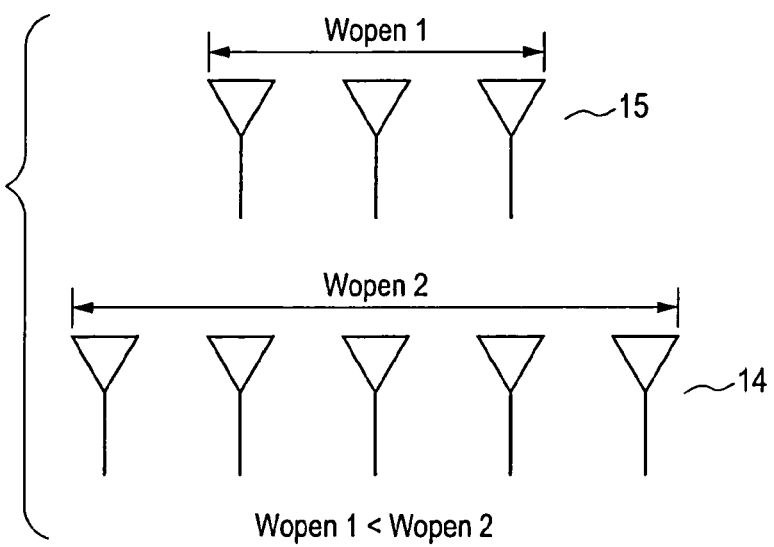
FIG. 12 is a view showing an open width of each array antenna of the radar apparatus according to a modification of the embodiments.

FIG. 12 is a view showing an open width Wopen of each array antenna. As shown in FIG. 12, because the open width Wopen1 of the array antenna 15 is narrower than the open width Wopen2 of the array antenna 14, the array antenna 15 is set as a grating lobe suppressing antenna.

Moreover, in the first to third embodiments, the width Wg of each grating lobe is set at the difference between angles at which the intensity of the grating lobe radiated from the array antenna 14 is reduced by $-10$ dB as compared with the peak intensity of the grating lobe. However, the width Wg of each grating lobe may be set at the difference between angles at which the intensity of the grating lobe is reduced by $-8$ dB or $-5$ dB. It is preferred that the width Wg of each grating lobe be set at the difference between angles at which the intensity of the grating lobe (in case of the array antenna 15 used as a grating lobe suppressing antenna) or the sensitivity to the grating lobe (in case of the array antenna 14 used as a grating lobe suppressing antenna) is reduced by a level, ranging from $-3$ dB to $-20$ dB, as compared with the peak intensity of the grating lobe or the maximum sensitivity to the grating lobe. More preferably, the width Wg of each grating lobe is set by using the reduction ranging from $-5$ dB to $-15$ dB. In this case, the interference of the grating lobe GL1 in the grating lobe suppressed antenna (e.g., the array antenna 14) with the main lobe ML in the grating lobe suppressing antenna (e.g., the array antenna 15) can be prevented, the increase in the intensity of the grating lobe GL1 received in the transmission-reception composite directivity DSR can be prevented, and the desired-to-undesired signal ratio (i.e., the ratio of the intensity of the main lobe to the intensity of the grating lobe in the production of the reception signal SR) can be set almost at one hundred (i.e., 20 dB).

Furthermore, in the first to third embodiments, the transmission array antenna 14 has five antenna elements 14a to 14e. However, the number of antenna elements in the array antenna 14 may be larger or smaller than five, if necessary. In the same manner, although the reception array antenna 15 has three antenna elements 15a to 15c, the number of antenna elements in the array antenna 15 may be larger or smaller than three, if necessary.

Still further, in the first to third embodiments, the transmission array antenna 14 is formed of a planar antenna in which a plurality of antenna elements are located on a plane. However, the array antenna 14 may not be formed of any planar antenna. In the same manner, although the reception array antenna 15 is formed of a planar antenna, the array antenna 15 may not be formed of any planar antenna.

Still further, in the first to third embodiments, when the microcomputer 10 sets the array antenna 14 as a grating lobe suppressing antenna, the microcomputer 10 sets one null point in each of the transmission directivities DS by adjusting phases of all processed transmission signal STp inputted to the array elements 14a to 14e in the phase shifter 13. However, the microcomputer 10 may set one null point in each transmission directivity DS by adjusting phases of processed transmission signals STp inputted to a part of the array elements 14a to 14e in the phase shifter 13. In the same manner, when the microcomputer 10 sets the array antenna 15 as a grating lobe suppressing antenna, the microcomputer 10 sets one null point in each of the reception directivities DS by adjusting phases of all unprocessed reception signal SRu produced in the array elements 15a to 15c in the phase shifter 16. However, the microcomputer 10 may set one null point in each reception directivity DS by adjusting phases of unprocessed reception signal SRu produced in a part of the array elements 15a to 15c in the phase shifter 16.

Still further, in the first embodiment, the radiation of electromagnetic waves is described with reference to FIG. 3 which shows the main lobe radiation direction set at zero degree. However, the main lobe ML is radiated from the array antenna 14 while being scanned to change the main lobe radiation direction in the detection area ranging from the direction of −90 degrees to the direction of +90 degrees. Further, the reflected main lobe ML is received in the array antenna 15 while changing the main lobe receiving direction so as to always coincide with the main lobe radiation direction. Therefore, when the reception directivities DR (in case of the array antenna 14 used as a grating lobe suppressing antenna) or the transmission directivities DS (in case of the array antenna 15 used as a grating lobe suppressing antenna) are changed one after another, the array antenna 15 can reliably prevent the reception of a portion of each grating lobe corresponding to one null point set in the reception directivity DR or the transmission directivity DS.

These embodiments should not be construed as limiting the present invention to structures of those embodiments, and the structure of this invention may be combined with that based on the prior art.

What is claimed is:

1. A radar apparatus, comprising:
    a transmission array antenna that includes a plurality of transmission antenna elements;
    a directivity control unit on a side of the transmission array antenna, which is configured to control directivity of the transmission array antenna by controlling phase of at least part of the plurality of transmission antenna elements;
    a reception array antenna that includes a plurality of reception antenna elements;
    a directivity control unit on a side of the reception array antenna, which is configured to control directivity of the reception array antenna by controlling phase of at least part of the plurality of reception antenna elements; and
    a target detecting unit configured to detect a target based on a reception signal having a transmission-reception composite directivity into which the directivity of the transmission array antenna and the directivity of the reception array antenna are combined, wherein
    one of the transmission array antenna and the reception array antenna is set as an array antenna on a grating suppressing side for suppressing a grating lobe and the other of the transmission array antenna and the reception array antenna is set as an array antenna on a grating suppressed side in which the grating lobe is suppressed,
    a directivity control unit on a grating suppressing side that is the directivity control unit on the side of the one of the transmission array antenna and the reception array antenna set as the antenna array on the grating suppressing side, which is configured to sequentially set a null point in the array antenna on the grating suppressing side to a plurality of setting directions different in angle from one another within a setting range corresponding to a width of the grating lobe in the array antenna on the grating suppressed side, and
    the target detecting unit is configured to produce a reception signal by averaging a plurality of reception signals which are received under the condition that the null point is set by the directivity control unit on the grating suppressing side, and detect the target based on the produced reception signal.

2. The radar apparatus according to claim 1, wherein the directivity control unit on the grating suppressing side, sets the setting range to an angle range of −3 dB to −20 dB with respect to peak of grating lobe in the array antenna on the grating suppressed side.

3. The radar apparatus according to claim 2, wherein the narrower in aperture width of the transmission array antenna and the reception array antenna is set as the array antenna on the grating suppressing side.

4. The radar apparatus according to claim 1, wherein the directivity control unit on the grating suppressing side, sets the setting range to an angle range of −5 dB to −15 dB with respect to peak of grating lobe in the array antenna on the grating suppressed side.

5. The radar apparatus according to claim 4, wherein the narrower in aperture width of the transmission array antenna and the reception array antenna is set as the array antenna on the grating suppressing side.

6. The radar apparatus according to claim 1, wherein the narrower in aperture width of the transmission array antenna and the reception array antenna is set as the array antenna on the grating suppressing side.

7. A radar apparatus, comprising:
    a transmission array antenna that includes a plurality of transmission antenna elements;
    a directivity control unit on a side of the transmission array antenna, which is configured to control directivity of the transmission array antenna by controlling phase of at least part of the plurality of transmission antenna elements;
    a reception array antenna that includes a plurality of reception antenna elements;
    a directivity control unit on a side of the reception array antenna, which is configured to control directivity of the reception array antenna by controlling phase of at least part of the plurality of reception antenna elements; and
    a target detecting unit configured to detect a target based on a reception signal having a transmission-reception composite directivity into which the directivity of the transmission array antenna and the directivity of the reception array antenna are combined, wherein
    one of the transmission array antenna and the reception array antenna is set as an array antenna on a grating suppressing side for suppressing a grating lobe and the other of the transmission array antenna and the reception array antenna is set as an array antenna on a grating suppressed side in which the grating lobe is suppressed, a directivity control unit on a grating suppressing side that is the directivity control unit on the side of the one of the transmission array antenna and the reception array antenna set as the antenna array on the grating suppressing side, which is configured to sequentially set a null point in the array antenna on the grating suppressing side to a plurality of setting directions different in angle from one another within a setting range corresponding to a width of the grating lobe in the array antenna on the grating suppressed side, and the target detecting unit is configured to produce a reception signal by extracting a minimum level for each direction from a plurality of reception signals which are received under the condition that the null point is set by the directivity control unit on the grating suppressing side, and detect the target based on the produced reception signal.

8. The radar apparatus according to claim 7, wherein the directivity control unit on the grating suppressing side, sets the setting range to an angle range of −3 dB to −20 dB with respect to peak of grating lobe in the array antenna on the grating suppressed side.

9. The radar apparatus according to claim 8, wherein the narrower in aperture width of the transmission array antenna and the reception array antenna is set as the array antenna on the grating suppressing side.

10. The radar apparatus according to claim 7, wherein the directivity control unit on the grating suppressing side, sets the setting range to an angle range of −5 dB to −15 dB with respect to peak of grating lobe in the array antenna on the grating suppressed side.

11. The radar apparatus according to claim 10, wherein the narrower in aperture width of the transmission array antenna and the reception array antenna is set as the array antenna on the grating suppressing side.

12. The radar apparatus according to claim 7, wherein the narrower in aperture width of the transmission array antenna and the reception array antenna is set as the array antenna on the grating suppressing side.

13. A radar apparatus, comprising:
a transmission array antenna that includes a plurality of transmission antenna elements;
a directivity control unit on a side of the transmission array antenna, which is configured to control directivity of the transmission array antenna by controlling phase of at least part of the plurality of transmission antenna elements;
a reception array antenna that includes a plurality of reception antenna elements;
a directivity control unit on a side of the reception array antenna, which is configured to control directivity of the reception array antenna by controlling phase of at least part of the plurality of reception antenna elements; and
a target detecting unit configured to detect a target based on a reception signal having a transmission-reception composite directivity into which the directivity of the transmission array antenna and the directivity of the reception array antenna are combined, wherein
one of the transmission array antenna and the reception array antenna is set as an array antenna on a grating suppressing side for suppressing a grating lobe and the other of the transmission array antenna and the reception array antenna is set as an array antenna on a grating suppressed side in which the grating lobe is suppressed,
a directivity control unit on a grating suppressing side that is the directivity control unit on the side of the one of the transmission array antenna and the reception array antenna set as the antenna array on the grating suppressing side, which is configured to sequentially set a null point in the array antenna on the grating suppressing side to a plurality of setting directions different in angle from one another within a setting range corresponding to a width of the grating lobe in the array antenna on the grating suppressed side, and
the target detecting unit is configured to detect the target based on a pattern of levels of a plurality of reception signals which are received under the condition that the null point is set by the directivity control unit on the grating suppressing side.

14. The radar apparatus according to claim 13, wherein the directivity control unit on the grating suppressing side, sets the setting range to an angle range of −3 dB to −20 dB with respect to peak of grating lobe in the array antenna on the grating suppressed side.

15. The radar apparatus according to claim 14, wherein the narrower in aperture width of the transmission array antenna and the reception array antenna is set as the array antenna on the grating suppressing side.

16. The radar apparatus according to claim 13, wherein the directivity control unit on the grating suppressing side, sets the setting range to an angle range of −5 dB to −15 dB with respect to peak of grating lobe in the array antenna on the grating suppressed side.

17. The radar apparatus according to claim 16, wherein the narrower in aperture width of the transmission array antenna and the reception array antenna is set as the array antenna on the grating suppressing side.

18. The radar apparatus according to claim 13, wherein the narrower in aperture width of the transmission array antenna and the reception array antenna is set as the array antenna on the grating suppressing side.

* * * * *